US012810142B2

(12) United States Patent
Cherupally et al.

(10) Patent No.: US 12,810,142 B2
(45) Date of Patent: Nov. 24, 2026

(54) HARDWARE NOISE-AWARE TRAINING FOR IMPROVING ACCURACY OF IN-MEMORY COMPUTING-BASED DEEP NEURAL NETWORK HARDWARE

(71) Applicants: Sai Kiran Cherupally, Tempe, AZ (US); Jian Meng, Tempe, AZ (US); Shihui Yin, Mesa, AZ (US); Deliang Fan, Tempe, AZ (US); Jae-sun Seo, Tempe, AZ (US)

(72) Inventors: Sai Kiran Cherupally, Tempe, AZ (US); Jian Meng, Tempe, AZ (US); Shihui Yin, Mesa, AZ (US); Deliang Fan, Tempe, AZ (US); Jae-sun Seo, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 1226 days.

(21) Appl. No.: 17/714,677

(22) Filed: Apr. 6, 2022

(65) Prior Publication Data

US 2022/0318628 A1 Oct. 6, 2022

Related U.S. Application Data

(60) Provisional application No. 63/171,448, filed on Apr. 6, 2021.

(51) Int. Cl.
*G06N 3/08* (2023.01)
*G06F 7/544* (2006.01)
(Continued)

(52) U.S. Cl.
CPC ............. *G06N 3/08* (2013.01); *G06F 7/5443* (2013.01); *G06N 3/04* (2013.01); *G06N 3/063* (2013.01)

(58) Field of Classification Search
CPC . G06N 3/04; G06N 3/063; G06N 3/08; G06F 7/5443
See application file for complete search history.

(56) References Cited

U.S. PATENT DOCUMENTS 11,537,861 B2 * 12/2022 Yudanov ............... G06F 3/0673
2021/0241096 A1 * 8/2021 Baskin ................. G06N 3/0495
2023/0229870 A1 * 7/2023 Kilani ...................... G06N 3/09
708/835

OTHER PUBLICATIONS

Chen, Y.-H. et al., "Eyeriss: An energy efficient reconfigurable accelerator for deep convolutional neural networks," EEE Journal of Solid-State Circuits, vol. 52, No. 1, Jan. 31-Feb. 4, 2016, IEEE, 12 pages.

(Continued)

*Primary Examiner* — Michael D. Yaary
(74) *Attorney, Agent, or Firm* — Womble Bond Dickinson (US) LLP

(57) ABSTRACT

Hardware noise-aware training for improving accuracy of in-memory computing (IMC)-based deep neural network (DNN) hardware is provided. DNNs have been very successful in large-scale recognition tasks, but they exhibit large computation and memory requirements. To address the memory bottleneck of digital DNN hardware accelerators, IMC designs have been presented to perform analog DNN computations inside the memory. Recent IMC designs have demonstrated high energy-efficiency, but this is achieved by trading off the noise margin, which can degrade the DNN inference accuracy. The present disclosure proposes hardware noise-aware DNN training to largely improve the DNN inference accuracy of IMC hardware. During DNN training, embodiments perform noise injection at the partial sum level, which matches with the crossbar structure of IMC hardware, and the injected noise data is directly based on measurements of actual IMC prototype chips.

20 Claims, 13 Drawing Sheets

(51) Int. Cl.
*G06N 3/04* (2023.01)
*G06N 3/063* (2023.01)

(56) References Cited

OTHER PUBLICATIONS

Choi, J. et al., "Accurate and Efficient 2-bit Quantized Neural Networks," Conference on Machine Learning and Systems (MLSys), 2019, 12 pages.
Deng, L. et al., "Model Compression and Hardware Acceleration for Neural Networks: A Comprehensive Survey," Proceedings of the IEEE, vol. 108, No. 4, Apr. 2020, first published Mar. 2020, IEEE, 48 pages.
Dong, Q. et al., "15.3 A 351TOPS/W and 372.4GOPS Compute-in-Memory SRAM Macro in 7nm FinFET CMOS for Machine-Learning Applications," IEEE International Solid-State Circuits Conference (ISSCC), Feb. 16-20, 2020, San Francisco, CA, USA, IEEE, 3 pages.
Esser, S. K. et al., "Learned Step Size Quantization," International Conference on Learning Representations (ICLR), Apr. 26-May 1, 2020, 12 pages.
Gonugondla, S.J. et al., "A 42pJ/decision 3.12TOPS/W robust in-memory machine learning classifier with on-chip training," 2018 IEEE International Solid—State Circuits Conference (ISSCC), Feb. 11-15, 2018, San Francisco, CA, USA, IEEE, 3 pages.
He, K. et al., "Deep Residual Learning for Image Recognition," 2016 IEEE Conference on Computer Vision and Pattern Recognition (CVPR), Jun. 27-30, 2016, Las Vegas, NV, USA, IEEE, 9 pages.
Howard, A.G. et al., "MobileNets: Efficient Convolutional Neural Networks for Mobile Vision Applications," arXiv: 1704.04861v1 [cs.CV], Apr. 17, 2017, 9 pages.
Hubara, I. et al., "Binarized Neural Networks," 30th Conference on Neural Information Processing Systems (NIPS 2016), Dec. 5-10, 2016, Barcelona, Spain, 9 pages.
Jacob, B. et al., "Quantization and Training of Neural Networks for Efficient Integer-Arithmetic-Only Inference," IEEE/CVF Conference on Computer Vision and Pattern Recognition (CVPR), Jun. 18-23, 2018, Salt Lake City, UT, USA, IEEE, 10 pages.
Jia, H. et al., "A Programmable Heterogeneous Microprocessor Based on Bit-Scalable In-Memory Computing," IEEE Journal of Solid-State Circuits, vol. 55, Issue 9, Sep. 2020, first published Apr. 2020, IEEE, 13 pages.
Jiang, Z. et al., "C3SRAM: An In-Memory-Computing SRAM Macro Based on Robust Capacitive Coupling Computing Mechanism," IEEE Journal of Solid-State Circuits, vol. 55, No. 7, Jul. 2020, 11 pages.
Joshi, V. et al., "Accurate DeepNeural Network Inference Using Computational Phase-Change Memory," Nature Communications, vol. 11, No. 1, May 2020, 13 pages.
Kim, H. et al., "BinaryDuo: Reducing Gradient Mismatch in Binary Activation Network by Coupling Binary Activations," International Conference on Learning Representations (ICLR), Feb. 2020, 19 pages.
Krizhevsky, A. et al., "ImageNet Classification with Deep Convolutional Neural Networks," Conference on Neural Information Processing Systems (NIPS 2012), Dec. 2012, 9 pages.
Lee, J. et al., "13.3 UNPU: A 50.6TOPS/W unified deep neural network accelerator with 1b-to-16b fully-variable weight bit-precision," 2018 IEEE International Solid - State Circuits Conference (ISSCC), Session 13, Feb. 11-15, 2018, San Francisco, CA, USA, IEEE, 3 pages.
Liu, Q. et al., "33.2 A Fully Integrated Analog ReRAM Based 78.4TOPS/W Compute-In-Memory Chip with Fully Parallel MAC Computing," 2020 IEEE International Solid- State Circuits Conference ISSCC), Feb. 16-20, 2020, San Francisco, CA, USA, IEEE, 3 pages.
Park, E. et al., "PROFIT: A Novel Training Method for sub-4-bit MobileNet Models," 16th European Conference on Computer Vision (ECCV), Aug. 23-28, 2020, Glasgow, UK, 17 pages.
Peng, X. et al., "DNN+NeuroSim: An End-to-End Benchmarking Framework for Compute-in-Memory Accelerators with Versatile Device Technologies," IEEE International Electron Devices Meeting (IEDM), Dec. 7-11, 2019, San Francisco, CA, USA, IEEE, 4 pages.
Rastegari, M. et al., "XNOR-Net: ImageNet Classification Using Binary Convolutional Neural Networks," European Conference on Computer Vision (ECCV), Mar. 2016, 17 pages.
Si, X. et al., "A Twin-8T SRAM Computation-in-Memory Unit-Macro for Multibit CNN-Based AI Edge Processors," IEEE Journal of Solid-State Circuits, vol. 55, No. 1, Jan. 2020, first published Nov. 2019, IEEE, 14 pages.
Sim, J. et al., "An Energy-Efficient Deep Convolutional Neural Network Inference Processor With Enhanced Output Stationary Dataflow in 65-nm CMOS," IEEE Transactions on Very Large Scale Integration (VLSI) Systems, vol. 28, No. 1, Jan. 2020, first published Sep. 2019, IEEE, 14 pages.
Simonyan, K. et al., "Very Deep Convolutional Networks for Large-Scale Image Recognition," arXiv:1409.1556v6 [cs.CV], Apr. 10, 2015, 14 pages.
Valavi, H. et al., "A 64-Tile 2.4-Mb In-Memory-Computing CNN Accelerator Employing Charge-Domain Compute," EEE Journal of Solid-State Circuits, vol. 54, Issue 6, Jun. 2019, first published Mar. 2019, IEEE, 11 pages.
Verma, N. et al., "In-Memory Computing: Advances and Prospects," IEEE Solid-State Circuits Magazine, vol. 11, No. 3, Summer 2019, IEEE, 13 pages.
Wei, W.-C. et al., "A Relaxed Quantization Training Method for Hardware Limitations of Resistive Random Access Memory (ReRAM)-Based Computing-in-Memory," IEEE Journal on Exploratory Solid-State Computational Devices and Circuits, vol. 6, Issue 1, Jun. 2020, first published May 2020, IEEE, 8 pages.
Xue, C.-X. et al., "15.4 A 22nm 2Mb ReRAM Compute-in-Memory Macro with 121-28TOPS/W for Multibit MAC Computing for Tiny AI Edge Devices," 2020 IEEE International Solid- State Circuits Conference (ISSCC), Feb. 16-20, 2020, San Francisco, CA, USA, IEEE, 3 pages.
Yin, S. et al., "XNOR-SRAM: In-Memory Computing SRAM Macro for Binary/Ternary Deep Neural Networks," IEEE Journal of Solid-State Circuits, vol. 55, No. 6, Jun. 2020, IEEE, 11 pages.
Yu, C. et al., "A 16K Current-Based 8T Sram Compute-In-Memory Macro with Decoupled Read/Write and 1-5bit Column ADC," IEEE Custom Integrated Circuits Conference (CICC), Mar. 22-25, 2020, Boston, MA, USA, IEEE, 4 pages.
Yue, J. et al., "7.5 A 65nm 0.39-to-140.3TOPS/W 1-to-12b Unified Neural-Network Processor Using Block-Circulant- Enabled Transpose-Domain Acceleration with 8.1x Higher TOPS/mm2 and 6T HBST-TRAM-Based 2D Data-Reuse Architecture," 2019 IEEE International Solid-State Circuits Conference (ISSCC), Feb. 17-21, 2019, San Francisco, CA, USA, IEEE, 3 pages.
Yue, J. et al., "14.3 A 65nm Computing-in-Memory-Based CNN Processor with 2.9-to-35.8TOPS/W System Energy Efficiency Using Dynamic-Sparsity Performance-Scaling Architecture and Energy-Efficient Inter/Intra-Macro Data Reuse," 2020 IEEE International Solid- State Circuits Conference (ISSCC), Feb. 16-20, 2020, San Francisco, CA, USA, IEEE, 3 pages.
Zhou, C. et al., "Noisy Machines: Understanding Noisy Neural Networks and Enhancing Robustness to Analog Hardware Errors Using Distillation," arXiv:2001.04974v1 [cs.LG], Jan. 14, 2020, 14 pages.
Zimmer, B. et al., "A 0.32-128 TOPS, Scalable Multi-Chip-Module-Based Deep Neural Network Inference Accelerator With Ground-Referenced Signaling in 16 nm," IEEE Journal of Solid-State Circuits, vol. 55, No. 4, Apr. 2020, first published Jan. 2020, IEEE, 13 pages.

* cited by examiner

HARDWARE NOISE-AWARE TRAINING FOR IMPROVING ACCURACY OF IN-MEMORY COMPUTING-BASED DEEP NEURAL NETWORK HARDWARE

RELATED APPLICATIONS

This application claims the benefit of provisional patent application Ser. No. 63/171,448, filed Apr. 6, 2021, the disclosure of which is hereby incorporated herein by reference in its entirety.

FIELD OF THE DISCLOSURE

The present disclosure is related to in-memory computing (IMC) for deep neural networks (DNNs).

BACKGROUND

Deep neural networks (DNNs) have been very successful across many practical applications including computer vision, natural language processing, autonomous driving, etc. However, to achieve high inference accuracy for complex tasks, DNNs necessitate a very large amount of computation and storage. For the inference of one image for the ImageNet dataset, state-of-the-art DNNs require billions of multiply-and-accumulate (MAC) operations and millions of weight parameter storage.

On the algorithm side, the arithmetic complexity of such DNNs has been aggressively reduced by low-precision quantization techniques, which also largely helps the storage requirements. Recently proposed low-precision DNNs have demonstrated that 2-bit/4-bit DNNs can achieve minimal accuracy degradation compared to full-precision models. Also, recent binary DNNs have shown noticeable improvement for ImageNet accuracy, compared to the initial binary DNNs.

On the hardware side, to efficiently implement DNNs onto custom application-specific integrated circuits (ASIC) chips, many digital DNN accelerators have been designed to support specialized dataflows for DNN computation. In these digital ASIC chips, DNN weights stored in static random-access memory (SRAM) arrays need to be accessed one row at a time and communicated to a separate computing unit such as a two-dimensional (2-D) systolic array of processing engines (PEs). Although the data reuse is enhanced through an on-chip memory hierarchy, the energy/power breakdown results show that memory access and data communication is accountable for a dominant portion (e.g., two-thirds or higher) of the total on-chip energy/power consumption.

As a means to address such memory bottlenecks, the in-memory computing (IMC) scheme has emerged as a promising technique. IMC performs MAC computation inside the on-chip memory (e.g., SRAM) by activating multiple/all rows of the memory array. The MAC result is represented by analog bitline voltage/current and subsequently digitized by an analog-to-digital converter (ADC) in the peripheral of the array. This substantially reduces data transfer (compared to digital accelerators with separate MAC arrays) and increases parallelism (compared to conventional row-by-row access), which significantly improves the energy-efficiency of MAC operations. Recently, several IMC SRAM designs have been demonstrated in ASIC chips, which reported high energy-efficiency values of up to hundreds of TOPS/W by efficiently combining storage and computation.

FIG. 1A is a graphical representation of MAC results for a prototype analog IMC chip design. FIG. 1B is a graphical representation of dot-product results for another prototype analog IMC chip design. FIG. 1C is a graphical representation of ideal pre-ADC value results for another prototype analog IMC chip design. IMC designs achieve higher energy-efficiency than digital counterparts by trading off the signal-to-noise ratio (SNR) since analog computation inherently involves variability and noise. FIGS. 1A-1C show variability in the ADC outputs for the same ideal MAC value.

Due to such intra-/inter-chip variations and ADC quantization noise, IMC designs often report accuracy degradation compared to the digital baseline, which is a critical concern. For example, DNN accuracy degradation higher than 7% for the CIFAR-10 dataset was reported when software trained DNNs are evaluated on the noisy IMC ASIC hardware of FIG. 1A, where all 256 rows of the IMC SRAM array are activated simultaneously. To mitigate this accuracy loss, some IMC SRAM works attempted to improve the SNR by limiting the number of activated rows for IMC operation, but this reduces the computing parallelism and the achievable energy-efficiency.

SUMMARY

Hardware noise-aware training for improving accuracy of in-memory computing (IMC)-based deep neural network (DNN) hardware is provided. DNNs have been very successful in large-scale recognition tasks, but they exhibit large computation and memory requirements. To address the memory bottleneck of digital DNN hardware accelerators, IMC designs have been presented to perform analog DNN computations inside the memory. Recent IMC designs have demonstrated high energy-efficiency, but this is achieved by trading off the noise margin, which can degrade the DNN inference accuracy.

The present disclosure proposes hardware noise-aware DNN training to largely improve the DNN inference accuracy of IMC hardware. During DNN training, embodiments perform noise injection at the partial sum level, which matches with the crossbar structure of IMC hardware, and the injected noise data is directly based on measurements of actual IMC prototype chips. Embodiments are evaluated on several DNNs including ResNet-18, AlexNet, and VGG with binary, 2-bit, and 4-bit activation/weight precision for the CIFAR-10 dataset. These DNNs are evaluated with measured noise data obtained from two different SRAM-based IMC prototype designs and five different chips, across different supply voltages that result in different amounts of noise. Furthermore, the effectiveness of the proposed DNN training is evaluated using individual chip noise data versus the ensemble noise from multiple chips. Across these various DNNs and IMC chip measurements, the proposed hardware noise-aware DNN training consistently improves DNN inference accuracy for actual IMC hardware, up to 17% accuracy improvement for the CIFAR-10 dataset.

An exemplary embodiment provides a method for performing hardware noise-aware training for a DNN. The method includes training the DNN for deployment on IMC hardware; and during the training, injecting pre-determined hardware noise into a forward pass of the DNN.

Another exemplary embodiment provides a computing system. The computing system includes an IMC engine, configured to train a deep neural network (DNN) and, during the training, injecting pre-determined hardware noise into a forward pass of the DNN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
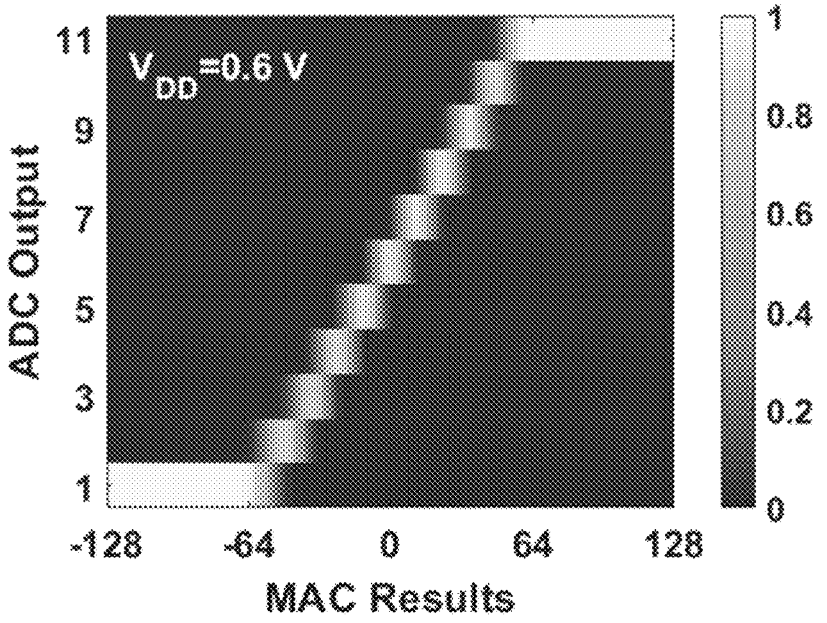
FIG. 1A is a graphical representation of multiply-and-accumulate (MAC) results for a prototype analog in-memory computing (IMC) chip design.
Figure 1B:
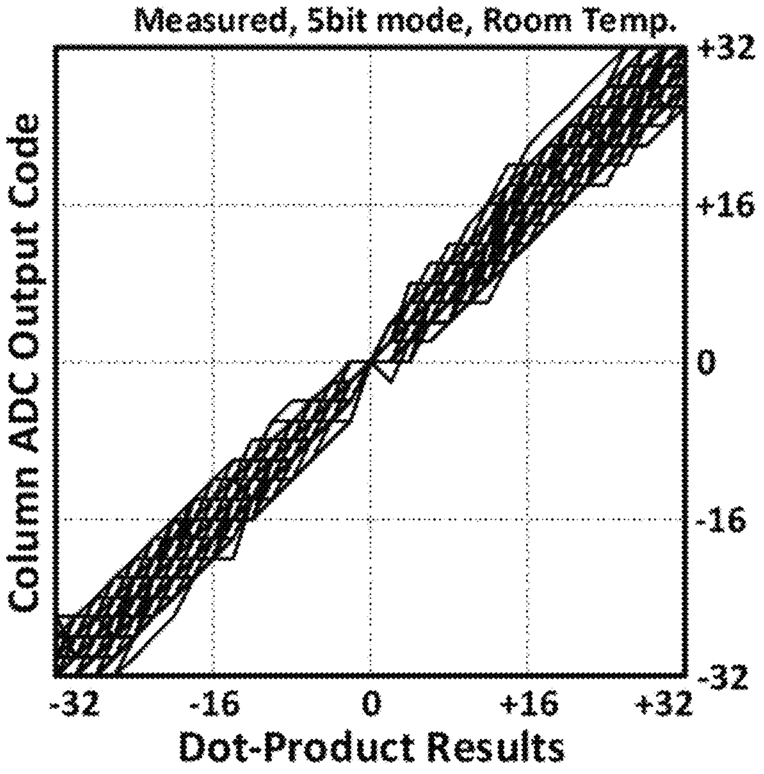
FIG. 1B is a graphical representation of dot-product results for another prototype analog IMC chip design.
Figure 1C:
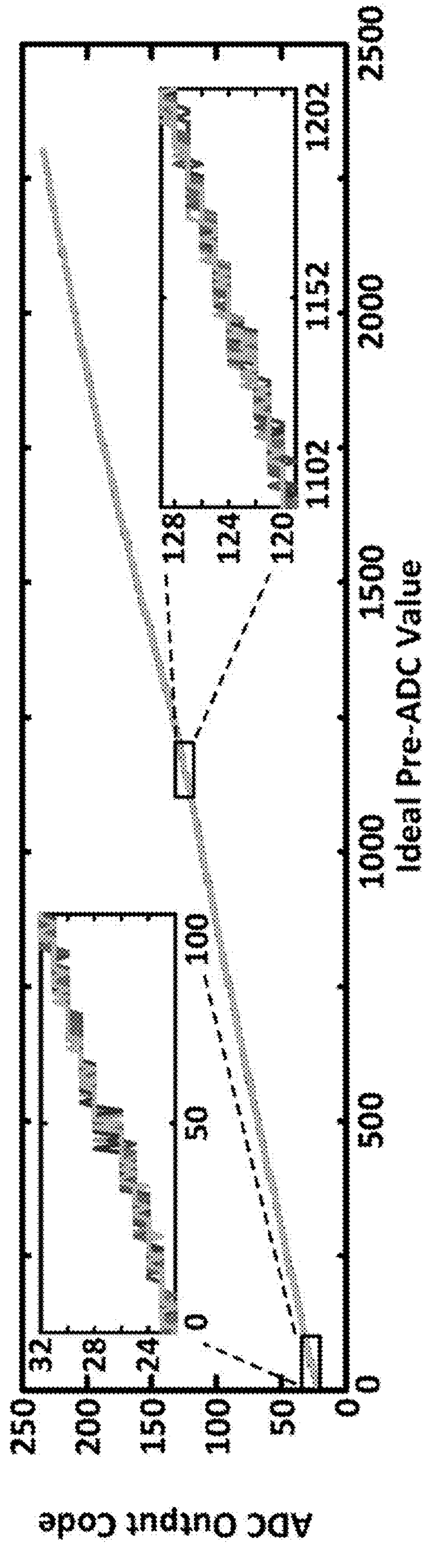
FIG. 1C is a graphical representation of ideal pre-analog-to-digital converter (ADC) value results for another prototype analog IMC chip design.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Hardware noise-aware training for improving accuracy of in-memory computing (IMC)-based deep neural network (DNN) hardware is provided. DNNs have been very successful in large-scale recognition tasks, but they exhibit large computation and memory requirements. To address the memory bottleneck of digital DNN hardware accelerators, IMC designs have been presented to perform analog DNN computations inside the memory. Recent IMC designs have demonstrated high energy-efficiency, but this is achieved by trading off the noise margin, which can degrade the DNN inference accuracy.

The present disclosure proposes hardware noise-aware DNN training to largely improve the DNN inference accuracy of IMC hardware. During DNN training, embodiments perform noise injection at the partial sum level, which matches with the crossbar structure of IMC hardware, and the injected noise data is directly based on measurements of actual IMC prototype chips. Embodiments are evaluated on several DNNs including ResNet-18, AlexNet, and VGG with binary, 2-bit, and 4-bit activation/weight precision for the CIFAR-10 dataset. These DNNs are evaluated with measured noise data obtained from two different SRAM-based IMC prototype designs and five different chips, across different supply voltages that result in different amounts of noise. Furthermore, the effectiveness of the proposed DNN training is evaluated using individual chip noise data versus the ensemble noise from multiple chips. Across these various DNNs and IMC chip measurements, the proposed hardware noise-aware DNN training consistently improves DNN inference accuracy for actual IMC hardware, up to 17% accuracy improvement for the CIFAR-10 dataset.

I. Introduction

Figure 2A:
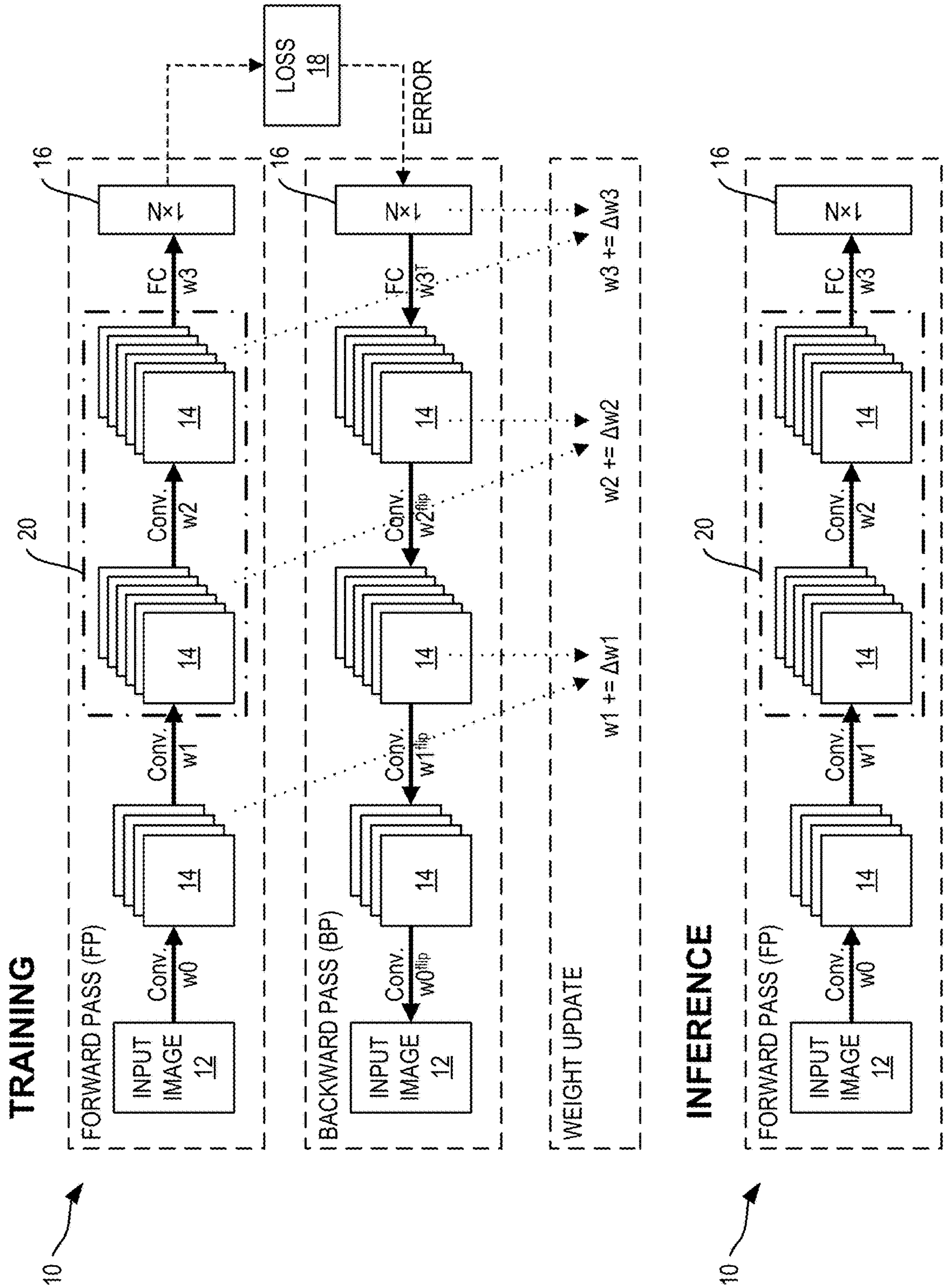
FIG. 2A is a schematic block diagram of IMC hardware noise-aware training and IMC inference evaluation according to embodiments proposed herein.

FIG. 2A is a schematic block diagram of IMC hardware noise-aware training and IMC inference evaluation according to embodiments proposed herein. An IMC engine 10 is provided for training a DNN using a forward pass and a backward pass of the IMC engine 10. Beginning with the forward pass, the IMC engine 10 receives an input image 12 (or other input data for evaluation by the DNN) and passes the input image 12 through multiple convolution layers 14 and a fully connected layer 16. Each convolution layer 14 and fully connected layer 16 uses a set of corresponding weights w0, w1, w2, w3 which are trained to minimize a loss function 18. The error from the loss function 18 is passed through a backward pass of the IMC engine 10 and used to update the weights w0, w1, w2, w3.

At the inference stage, the trained IMC engine 10 is used in a forward pass to evaluate the input image 10. Thus, the input image is passed through each of the convolution layer 14 and fully connected layer 16 using the corresponding weights w0, w1, w2, w3 obtained from the training phase. A convolution layer forward pass 20 is further illustrated in FIGS. 2B and 2C, showing a conventional approach and the hardware-aware approach of embodiments described herein.

Figure 2B:
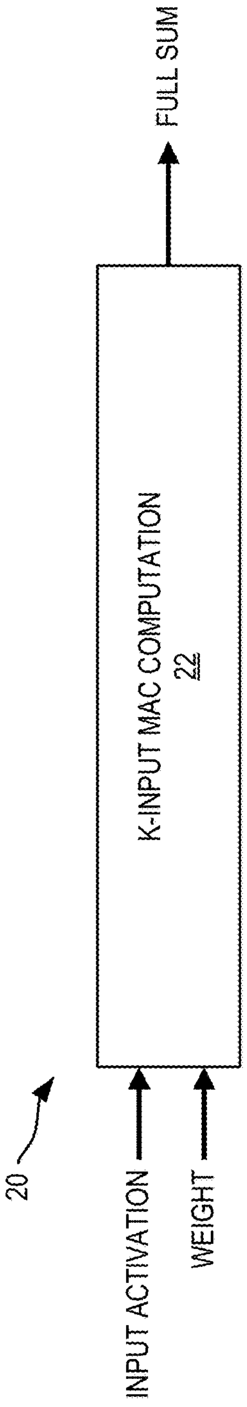
FIG. 2B is a schematic diagram illustrating a forward pass of a convolution layer with conventional training.

FIG. 2B is a schematic diagram illustrating a forward pass 20 of a convolution layer 14 with conventional training. Under the conventional approach, a K-input MAC computation 22 is performed using the input activation and weights, and a full sum is provided.

Figure 2C:
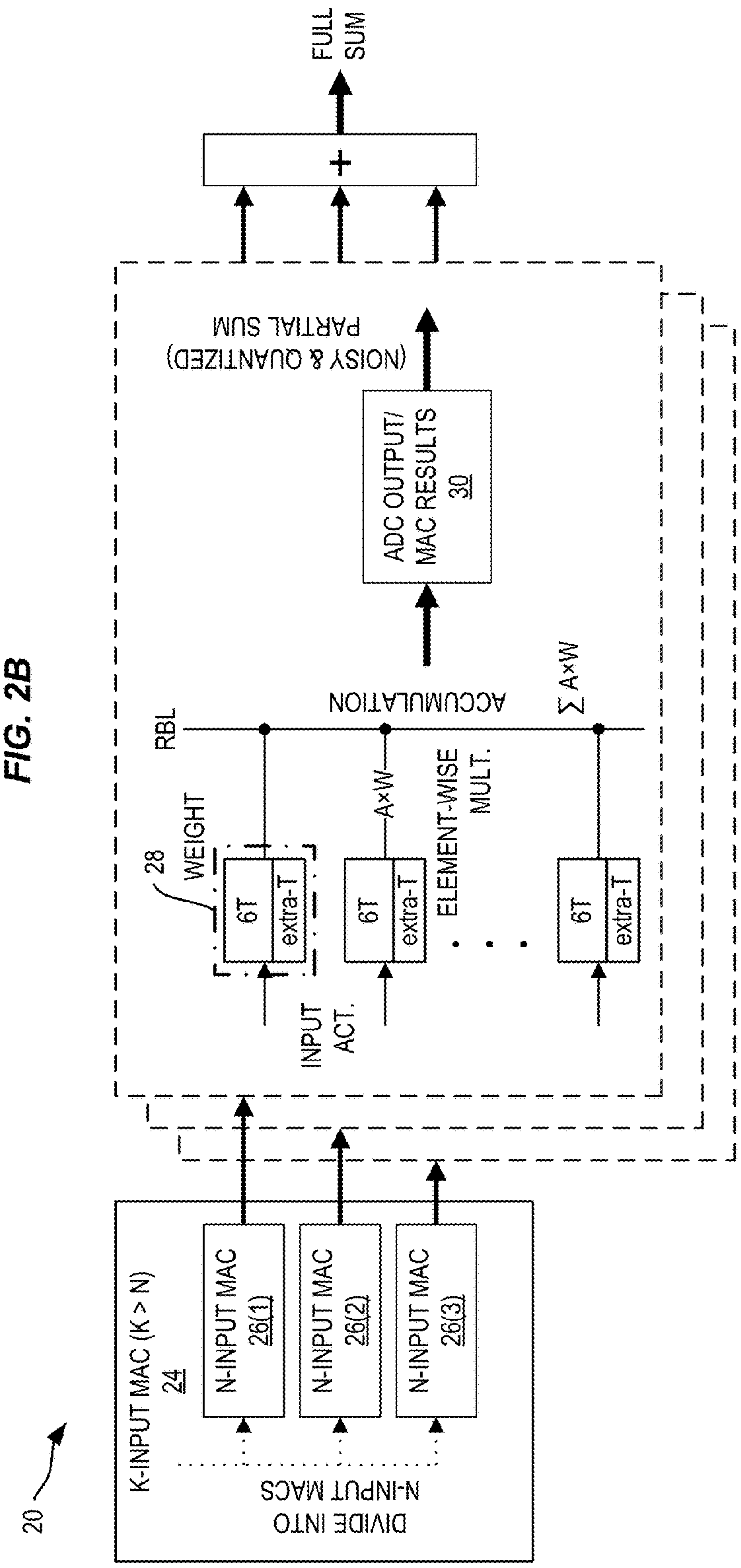
FIG. 2C is a schematic diagram illustrating a forward pass of a convolution layer with hardware noise-aware training or inference.

FIG. 2C is a schematic diagram illustrating a forward pass 20 of a convolution layer 14 with hardware noise-aware training or inference. In embodiments described herein, a K-input MAC 24 is divided into multiple N-input MACs 26(1), 26(2), 26(3) (e.g., where K>N). Each N-input MAC 26(1), 26(2), 26(3) includes an array of parallel IMC bitcells 28 which perform element-wise multiplication, to yield MAC results 30 representing a partial sum. Then the partial sums from the MAC results 30 of the different N-input MACs 26 are accumulated to provide a full sum.

The present disclosure presents a novel hardware noise-aware DNN training scheme to largely recover the accuracy loss of highly-parallel (e.g., 256 rows activated together) IMC hardware. Different from a few prior works that performed noise injection for DNN accuracy improvement of IMC hardware, in embodiments described herein (1) noise injection is performed at the partial sum level that matches with the IMC crossbar, and (2) the injected noise is based on actual hardware noise measured from two recent IMC prototype designs.

Evaluation results are obtained by performing noise-aware training and inference with several DNNs including ResNet-18, AlexNet, and VGG with binary, 2-bit, and 4-bit activation/weight precision for the CIFAR-10 dataset. Furthermore, by using noise data obtained from five different chips, the effectiveness of the proposed DNN training is evaluated using individual chip noise data versus the ensemble noise from multiple chips.

The key contributions and observations of this work are:

- To effectively improve DNN accuracy of IMC hardware, hardware extracted noise for DNN training is injected at the partial sum level, which matches with the IMC crossbar structure. This also allows for incorporation of both IMC variability/noise and ADC quantization noise collectively in the proposed training algorithm.
- Noise-injection training is performed and DNN inference accuracy of prototype IMC chips is evaluated based on measured noise. Commonly used Gaussian noise-based training/inference results in suboptimal DNN accuracy for real IMC silicon.
- The proposed hardware noise-based DNN training and inference is performed with two different IMC designs' measurement results across multiple DNNs for the CIFAR-10 dataset. Considerable accuracy improvement up to 16.8% for CIFAR-10 is achieved, compared to IMC inference without noise-aware training.
- Considering inter-/intra-chip variations, the individual chip data-based training and overall chips data-based ensemble training methods are evaluated.

II. SRAM Based In-Memory Computing

In IMC systems, DNN weights are stored in a crossbar structure, and analog computation is performed typically by applying activations as the voltage from the row side and accumulating the bitwise multiplication result via analog voltage/current on the column side. ADCs at the periphery quantize the analog voltage/current into digital values. This way, vector-matrix multiplication (VMM) of activation vectors and the stored weight matrices can be computed in a highly parallel manner without reading out the weights.

Both SRAM based IMC and non-volatile memory (NVM) based IMC have been proposed. While NVM devices have density advantages compared to SRAMs, availability of embedded NVMs in scaled CMOS technologies is limited, and peripheral circuits such as ADCs often dominate the area. Accordingly, a recent study reported that 7 nanometer (nm) SRAM IMC designs exhibit smaller area and energy-delay-product than 32 nm NVM IMC designs. In addition, several device non-idealities such as low on/off ratio, endurance, relaxation, etc., pose challenges for robust NVM IMC and large-scale integration. On the other hand, SRAM has a very high on/off ratio and the SRAM IMC scheme can be implemented in any latest CMOS technology. To that end, this disclosure focuses on SRAM IMC designs.

SRAM IMC schemes can be categorized into resistive and capacitive IMC. Resistive IMC uses the resistive pulldown/pull-up of transistors in the SRAM bitcell, while capacitive IMC employs additional capacitors in the bitcell to compute MAC operations via capacitive coupling or charge sharing.

Figure 3:
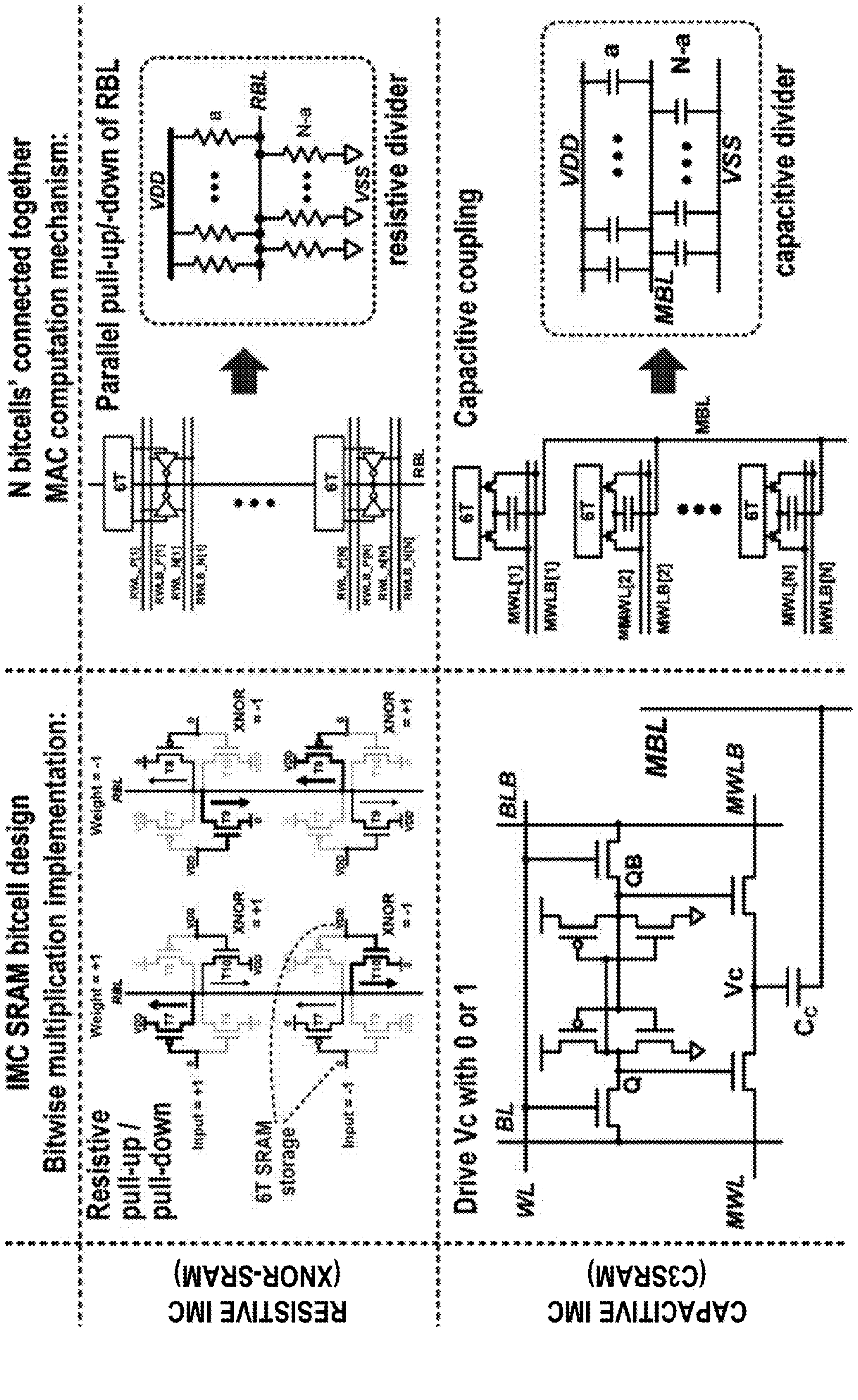
FIG. 3 is a schematic diagram illustrating the design and operation of a representative resistive static random-access memory (SRAM) IMC design and a representative capacitive SRAM IMC design.

FIG. 3 is a schematic diagram illustrating the design and operation of a representative resistive SRAM IMC design (adapted from Yin, S., Jiang, Z., Seo, J.-S., and Seok, M., "XNOR-SRAM: In-Memory Computing SRAM Macro for Binary/Ternary Deep Neural Networks," in *IEEE Journal of Solid-State Circuits,* 55(6): 1733-1743, 2020, and referred to as "XNOR-SRAM") and a representative capacitive SRAM IMC design (adapted from Jiang, Z., Yin, S., Seo, J., and Seok, M., "C3SRAM: An In-Memory-Computing SRAM Macro Based on Robust Capacitive Coupling Computing Mechanism," in *IEEE Journal of Solid-State Circuits* (*JSSC*), 55(7): 1888-1897, 2020, and referred to as "C3SRAM," which is incorporated herein by reference in its entirety). In XNOR-SRAM, the binary multiplication (XNOR) between activations driving the rows and weights stored in 6T SRAM is implemented by the complimentary pull-up/pull-down circuits of four additional transistors. In C3SRAM, an additional metal-oxide-metal (MOM) capacitor is introduced per bitcell to perform MAC operations via capacitive coupling. For resistive and capacitive IMC designs, each bitcell's bitwise multiplication result is accumulated onto the analog bitline voltage by forming a resistive and a capacitive divider, respectively.

Accuracy degradation has been reported when software-trained DNNs are deployed on IMC hardware due to quantization noise, process variations, and transistor nonlinearity. To address this, several prior works have employed the information on non-ideal hardware characteristics during DNN training to improve the DNN inference accuracy with IMC hardware. For example, on-chip training circuits have been proposed, but incur a large overhead in both area and energy. A quantization-aware DNN training scheme has been proposed, but it only allows for up to 36 rows to be activated simultaneously and incurs a >2% accuracy loss.

Several recent works have employed noise injection during DNN training to improve the DNN inference accuracy of IMC hardware. The noise-aware DNN training schemes in these approaches inject weight-level noise drawn from Gaussian distributions, and do not consider the crossbar structure of IMC or the ADC quantization noise at the crossbar periphery. In contrast, the hardware noise-aware DNN training scheme proposed herein performs noise injection on the partial sum level that matches with the IMC crossbar structure, and the injected noise is directly from IMC chip measurement results on the quantized ADC outputs for different partial sum (MAC) values.

III. Proposed IMC Hardware Noise-Aware DNN Training

In IMC hardware, depending on the ADC precision, the partial sums are quantized to a limited number of ADC levels. Due to the variability of devices (transistors, wires, and capacitors), the partial sums from the DNN computation that have the same MAC value could result in different ADC outputs. To characterize this noisy quantization behavior, a large number of IMC chip measurements can be performed with random input activation vectors and weight vectors for different MAC values, and two-dimensional (2-D) histograms between MAC value and ADC output can be obtained (e.g., as illustrated in FIG. 1A). This can be converted to a conditional probability table, which describes a lumped statistical model of the IMC chip. In this statistical model, for a given MAC value, the ADC output follows a discrete distribution according to the conditional probability table. A set of previously reported XNOR-SRAM and C3SRAM chip measurement results were used to evaluate the proposed noise-aware DNN training and inference accuracy.

A. IMC Hardware and Quantization Noise

Both XNOR-SRAM and C 3SRAM IMC macros contain 256 rows of memory cells and 11-level ADCs, which digitize the bitline voltage after performing the analog MAC computation. Both macros are capable of performing the 256-input dot-product with signed binary input activations and weights (−1 and +1). The dot-product or MAC results are in the range from −256 to +256, and this is represented by the analog bitline voltage between 0V and the supply voltage. The 11-level ADC at the periphery quantizes the analog bitline voltage to one of the 11 possible output levels, e.g., [−60, −48, −36, −24, −12, 0, 12, 24, 36, 48, 60]. As mentioned earlier, each possible MAC value could be quantized to any of the 11 different ADC levels, and hence there exists a probability corresponding to every bit-count and every ADC level.

Figure 4:
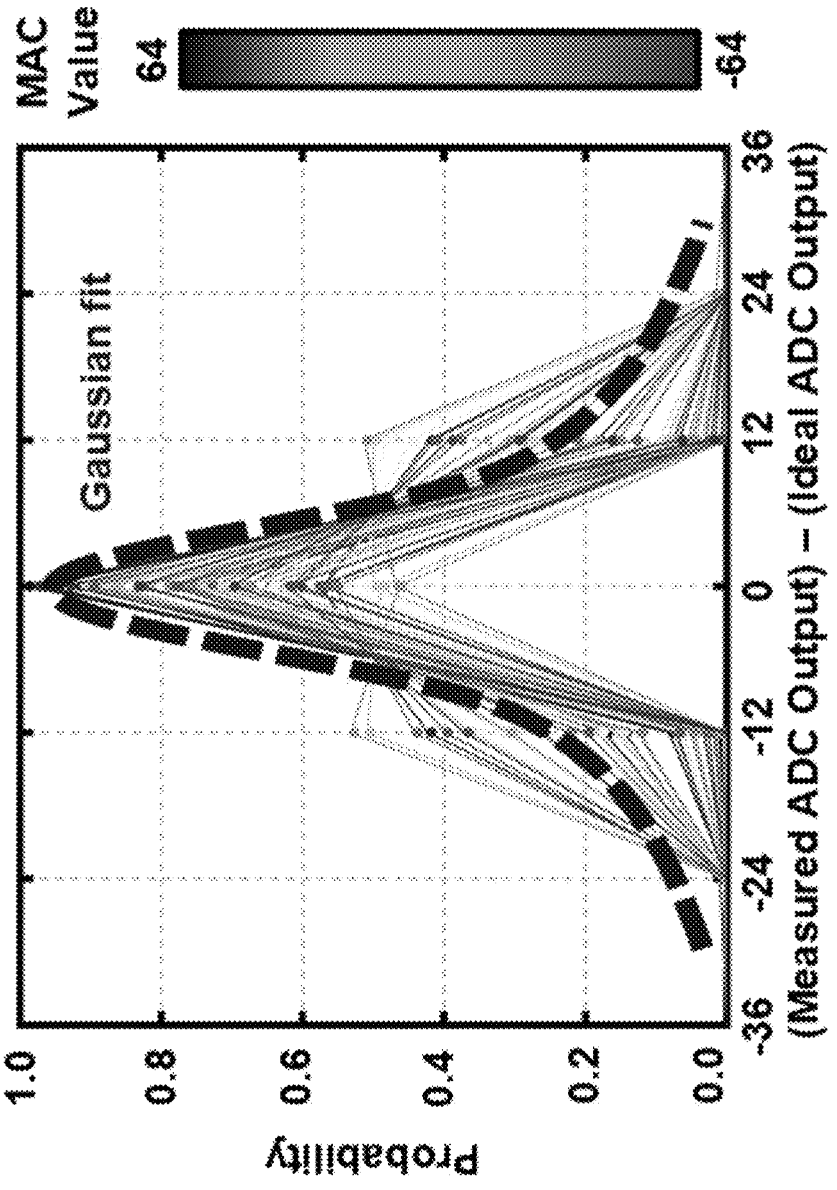
FIG. 4 is a graphical representation of an average quantization error distribution obtained based on XNOR-SRAM measurement data.

FIG. 4 is a graphical representation of an average quantization error distribution obtained based on XNOR-SRAM measurement data. The ADC quantization error is defined as the difference between the measured ADC output and the ideal ADC output. The distribution of the ADC quantization error in FIG. 4 is inferred from the corresponding conditional probability table in five different XNOR-SRAM chips measured at 0.6V, where each curve represents the error distribution for a particular MAC value in the range of −64 to +64. Although different MAC values have different probability distributions, it can be seen that the error resembles a normal distribution in most cases of inputs, and hence an approximate Gaussian curve-fit was obtained with a mean of 0.16 and a standard deviation of 5.99. The fitted Gaussian model depicts a MAC-value-independent ADC quantization error distribution, which can be used as a faster noise model approximation of hardware noise (see Section III.C).

For multi-bit DNN evaluation, multi-bit weights are split across multiple columns of the IMC SRAM array and multi-bit activations are fed to the IMC SRAM array over multiple cycles to perform bit-serial processing. Bit-by-bit MAC computation between split sub-activations and sub-weights is performed to obtain the digitized partial sums from the ADC outputs. The partial sums are then accumulated with proper binary-weighted coefficients depending on the bit positions of the sub-activations/weights, and the full sum for a given neuron in the DNN layer is obtained.

If the supply voltage changes, the noise/variability gets affected, and the IMC prototype chip measurement results change as well. Also, intra-chip (e.g., different SRAM columns) and inter-chip (e.g., different chips) variations exist, which affect the amount of noise introduced to the analog MAC computation as well as the resultant DNN accuracy.

B. DNN Inference With IMC Hardware Emulation

With reference to FIGS. 2A and 2C, the portions of code corresponding to the MAC computations, including convolution layers 14 and fully-connected layers 16, are modified to emulate the IMC hardware behavior. IMC hardware can perform a dot-product with a limited number of inputs and weights, which is determined by the number of rows of IMC hardware. The MAC operations in convolution layers 14 and fully-connected layers 16 of DNNs are divided into multiple blocks of data (e.g., N-input MACs 26(1), 26(2), 26(3)), where the size of each block is equal to the number of rows of the IMC SRAM array. Each block of data is then used to obtain a partial sum (e.g., MAC results 30), and stochastic quantization is performed on it according to the conditional probability table. The individual noisy quantized partial sums are then added together digitally to obtain the full sum of the DNN layer. In this way, an entire DNN can be emulated.

Figure 5:
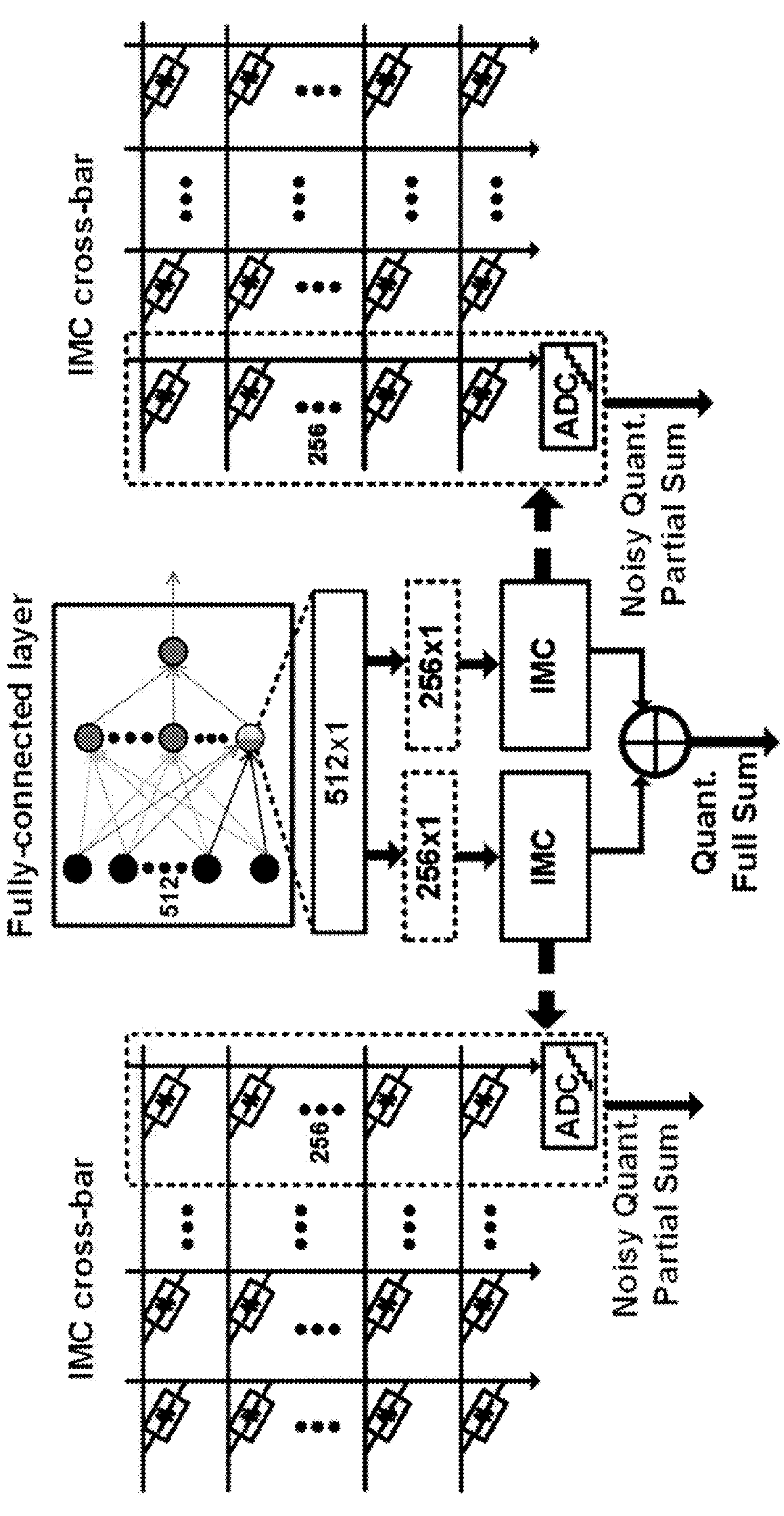
FIG. 5 is a schematic diagram of IMC hardware with 256 rows for evaluation of a fully-connected neuron with 512 inputs.

FIG. 5 is a schematic diagram of IMC hardware with 256 rows for evaluation of a fully-connected neuron with 512 inputs. The 512-input fully-connected neuron is evaluated by dividing the 512×1 input vector into two 256×1 vectors and performing two IMC dot-product operations. The full quantized dot-product can be obtained by either using two different columns on the IMC hardware simultaneously or by using one IMC column twice in software emulation.

C. Hardware Noise-Aware Training

In the conventional IMC works, the training algorithm was not made aware of the hardware variability and quantization noise but when software-trained DNNs are deployed on the IMC hardware, the inference is affected by the above-discussed hardware noise. To address this issue, the noise-aware DNN training is performed by injecting the measured hardware noise into the forward pass of the DNNs during training (see FIG. 2A). The hardware noise is injected by emulating the IMC macro's dot-product computation and then using the conditional probability tables to transform the smaller chunks of dot-product values (i.e., partial sums) in a similar way to the actual IMC hardware, as shown in Algorithm 1. This is made trainable by using the straight-through-estimator for the backward pass. Since the proposed IMC hardware noise-aware training introduced probability look-up table computation into the DNN forward path, the training speed was reduced as the probability lookup could not be efficiently parallelized. Therefore, noise-aware training was performed by replacing the probability tables with the single noise model approximation, which is a closed-form Gaussian function with the extracted mean and standard deviation parameters, as shown in FIG. 4. The comparison of two training schemes (MAC value-dependent probability table vs. single noise model) regarding training time and obtained DNN accuracy results for IMC hardware is reported in Section IV.A.

Algorithm 1 Hardware noise injection during DNN training

```
Input: n binary inputs x_i and weights w_i
Input: IMC row-size r
Input: cumulative noise probability matrix pt
Output: Noisy quantized dot-product Q(Σ_1^n x_i × w_i)
Initialize: number of chunks c = ceil(n/r)
Initialize: Divide the inputs and weights into c chunks
Initialize: dot-product, d = 0.
cdf.find(cdf, x): identifies the index of the first element
in cdf that is less than x
random.normal( ): returns a random float in [0, 1]
for i = 1 to c do
   partial-sum ps = Σ_1^r x_i × w_i
   level-probs = pt[ps]
   index = cdf.find(level-probs, random.normal(j)
   qlevel = levels[index]
   Q(cdp) = qlevel
   d = d + Q(cdp)
end for
return d
```

IV. Evaluation and Results

Hardware noise-aware DNN training was performed using the CIFAR-10 dataset. ResNet-18 (as described in He, K., Zhang, X., Ren, S., and Sun, J., "Deep Residual Learning for Image Recognition," in *IEEE/CVF Conference on Computer Vision and Pattern Recognition* (*CVPR*), June 2016, which is incorporated herein by reference in its entirety), AlexNet (as described in Krizhevsky, A., Sutskever, I., and Hinton, G. E., "ImageNet Classification with Deep Convolutional Neural Networks," in *Advances in Neural Information Processing Systems*, pp. 1097-1105, 2012, which is incorporated herein by reference in its entirety), VGG (as described in Simonyan, K. and Zisserman, A, "Very Deep Convolutional Networks for Large-Scale Image Recognition," in *International Conference on Learning Representations,* 2015, which is incorporated herein by reference in its entirety), and MobileNet (as described in Howard, A. G., Zhu, M., Chen, B., Kalenichenko, D., Wang, W., Weyand, T., Andreetto, M., and Adam, H., "MobileNets: Efficient Convolutional Neural Networks for Mobile Vision Applications," CoRR, abs/1704.04861, 2017, URL http://arxiv.org/labs/1704.04861, which is incorporated herein by reference in its entirety) DNN models were trained and evaluated with 1-bit, 2-bit, and 4-bit activation/weight precision. Noise data was measured from two different IMC chips of XNOR-SRAM and C3SRAM at different supply voltages to perform the proposed IMC hardware noise-aware training. Furthermore, ensemble noise-aware training was also performed, by combining the probability tables of five different XNOR-SRAM chips and obtaining a single unified probability table that represents the noise from the five different chips.

Quantization-aware training was employed for low-precision DNN inference. For the proposed hardware noise-aware training, all DNNs were trained by using a batch-size of 50 and default hyperparameters. Furthermore, the reported DNN inference accuracy values are the average values obtained from five inference evaluations of the same DNN under the same conditions of noise used during the proposed training process.

In all the results, software baseline DNNs were trained where no noise was injected during training, and the same DNNs were trained by injecting the IMC hardware noise. To clarify, the following set of accuracies are obtained: (1) Baseline Accuracy represents software baseline inference accuracy without any noise injection, (2) Conventional IMC Inference Accuracy represents the DNN inference accuracy with IMC dot-product evaluation on the baseline DNN models without noise-aware training, and (3) Noise-Aware IMC Inference Accuracy represents IMC dot-product evaluation on the new DNN model that is trained with the proposed hardware noise injection. When software trained DNNs are directly deployed onto IMC hardware, DNN accuracy degradation occurs. By using the proposed IMC hardware noise-aware training, embodiments aim to largely recover the DNN accuracy loss of the IMC hardware.

A. XNOR-SRAM Noise-Aware Training With CIFAR-10 Dataset

By using the XNOR-SRAM chip measurement results and noise probability tables, the proposed noise-aware DNN training was performed for the CIFAR-10 dataset for different types of DNNs, with different activation/weight precision, with different types of noise models, with noise from different chip voltages, and also across different physical chips.

1. Different DNNs

In this evaluation, DNN training and inference was performed on four different DNNs of ResNet-18, VGG, AlexNet. and MobileNet for CIFAR-10, using the XNOR-SRAM noise measurements from a single chip at the supply voltage of 0.6V. First, the hardware noise-aware training is performed on the binarized versions of these DNNs, where only convolution layers are binarized for MobileNet. Subsequently, the ResNet-18 DNNs with 2-bit and 4-bit activation/weight precision are evaluated for the proposed noise-aware training.

Figure 6A:
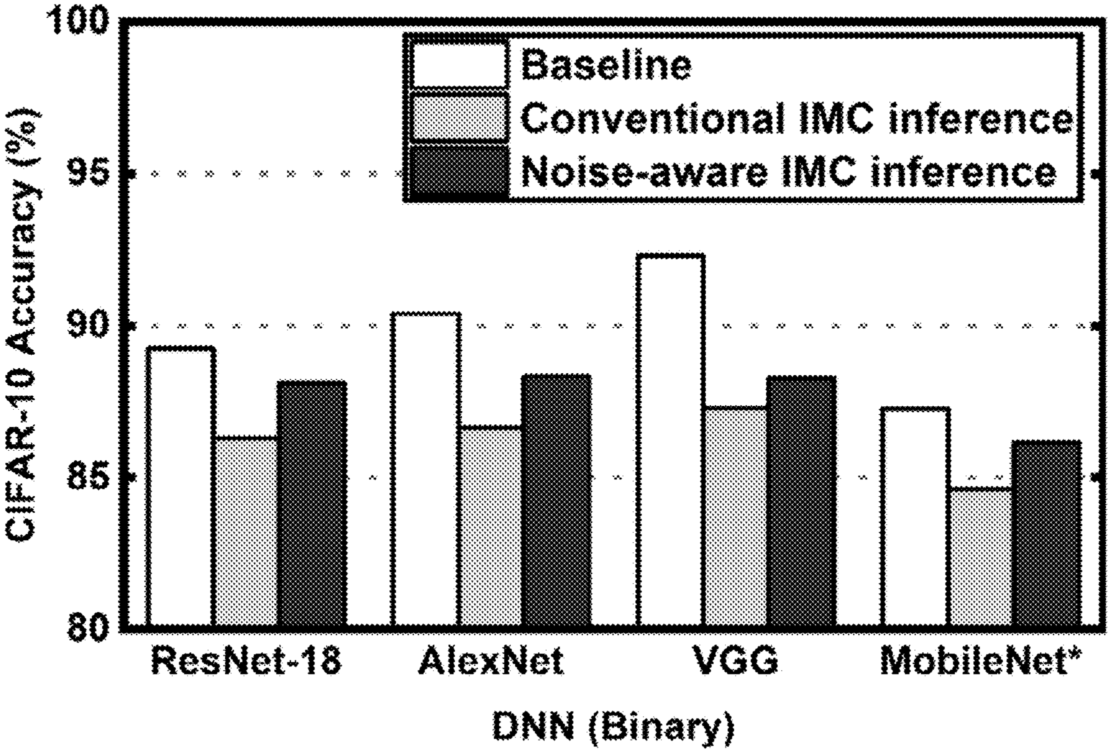
FIG. 6A is a graphical representation of IMC inference accuracy after hardware noise-aware training of deep neural network (DNN) topologies in ResNet-18, VGG, MobileNet, and AlexNet.

FIG. 6A is a graphical representation of IMC inference accuracy after hardware noise-aware training of DNN topologies in ResNet-18, VGG, MobileNet, and AlexNet. The results show that noise-aware training helps restore the IMC hardware accuracy closer to the ideal software baseline in all three cases as indicated by the darkest bars. In particular, the IMC hardware accuracy of ResNet-18 can be restored to within about 1% of the software baseline from an earlier degradation of 3.5%.

Figure 6B:
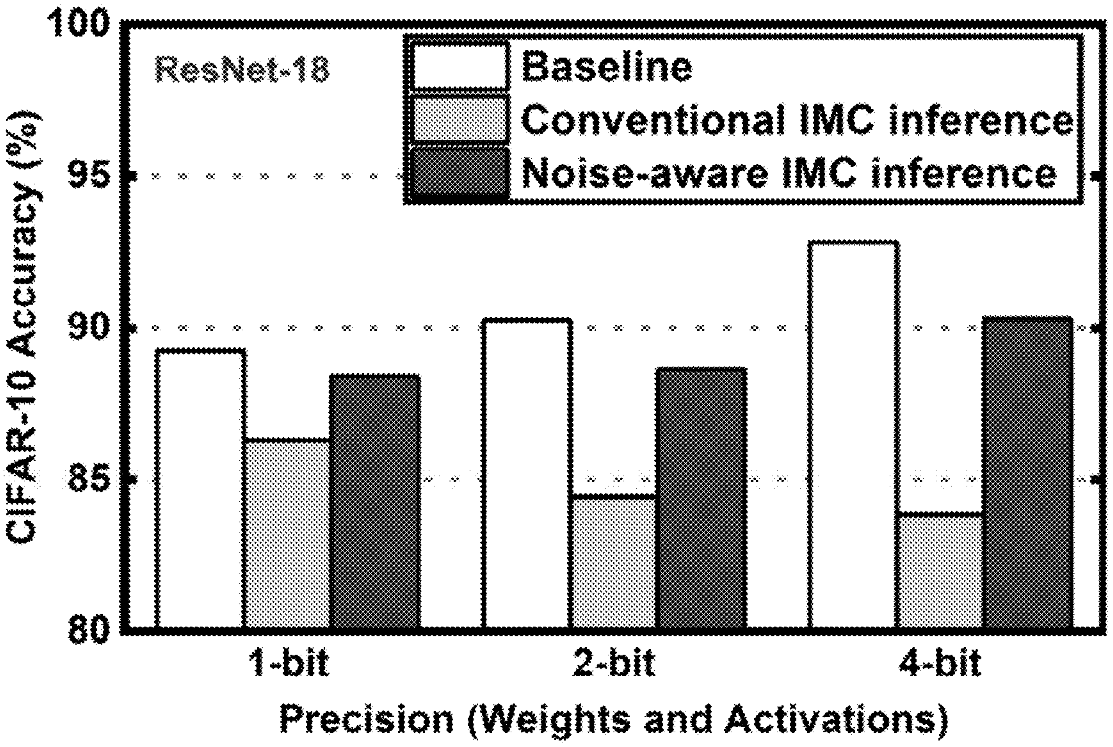
FIG. 6B is a graphical representation of IMC inference accuracy after hardware noise-aware training of different parameter precisions for ResNet-18 DNN on CIFAR-10 dataset with noise from one XNOR-SRAM chip measured at 0.6V.

FIG. 6B is a graphical representation of IMC inference accuracy after hardware noise-aware training of different parameter precisions for ResNet-18 DNN on CIFAR-10 dataset with noise from one XNOR-SRAM chip measured at 0.6V. FIG. 6B shows the IMC hardware accuracy improvements in ResNet-18 DNNs for three different activation/weight precision values of 1-bit, 2-bit, and 4-bit. The results show that as the DNN precision is increased, the IMC accuracy without noise-aware training worsens. This is because IMC hardware performs bit-wise computations in each column, and as multiple columns' ADC outputs get shifted and accumulated, a higher amount of noise is added to the multi-bit MAC computation. However, the proposed noise-aware training scheme can restore the accuracy losses for binary, 2-bit, and 4-bit ResNet DNNs, to the levels that are all close to the software baseline values.

2. Noise Measured at Different Chip Voltages

The supply voltage of the chip affects analog IMC operation. Higher supply voltages worsen the IMC noise, due to a higher IR drop on bitline voltage. Hardware noise-aware training was performed using the XNOR-SRAM noise data at three different supply voltages of 0.6V, 0.8V, and 1.0V.

Figure 7:
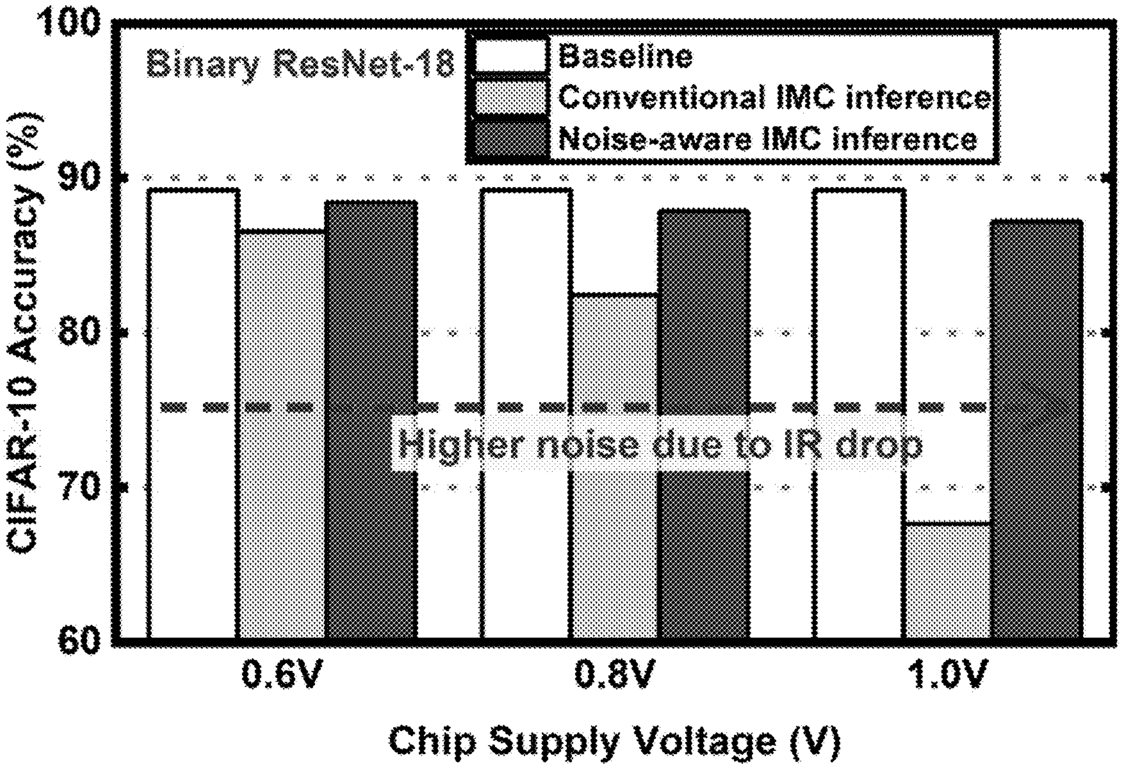
FIG. 7 is a graphical representation of binary ResNet-18 DNN accuracy for CIFAR-10 of XNOR-SRAM IMC hardware for conventional IMC inference and noise-aware IMC inference, using measured noise at three different supply voltages.

FIG. 7 is a graphical representation of binary ResNet-18 DNN accuracy for CIFAR-10 of XNOR-SRAM IMC hardware for conventional IMC inference and noise-aware IMC inference, using measured noise at three different supply voltages. These results indicate that the noise-aware IMC accuracy is better than the conventional IMC accuracy in all three supply voltages. In particular, IMC accuracy degrades rapidly as the IMC noise worsens at the supply voltage of 1.0V, but the proposed noise-aware training largely recovers this severe accuracy loss.

Figure 8:
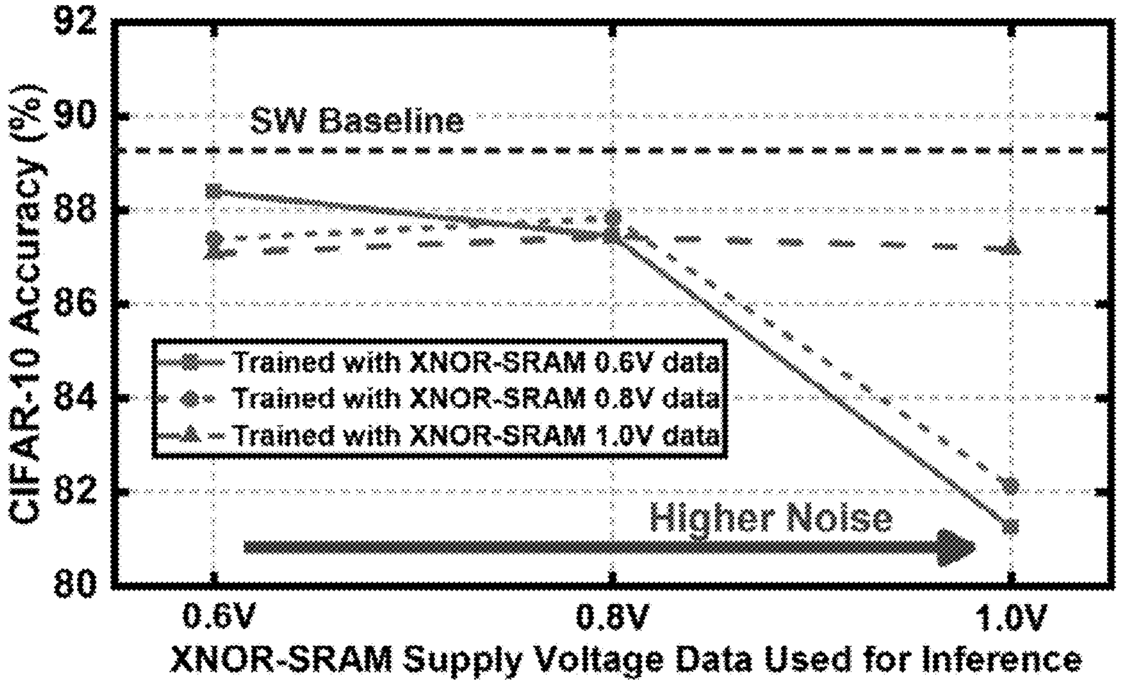
FIG. 8 is a graphical representation of binary ResNet-18 DNN accuracy of XNOR-SRAM IMC hardware for conventional IMC inference and noise-aware IMC inference, trained and inference with the measured noise at three different supply voltages.

FIG. 8 is a graphical representation of binary ResNet-18 DNN accuracy of XNOR-SRAM IMC hardware for conventional IMC inference and noise-aware IMC inference, trained and inference with the measured noise at three different supply voltages. The binary ResNet-18 was trained using the measured noise data of XNOR-SRAM chip at 0.6V, 0.8V, and 1.0V, and each network's inference accuracy was evaluated across the noise data at 0.6V, 0.8V, and 1.0V. First, when the noise during training and inference are identical, the best DNN inference accuracy is achieved, for all cases of 0.6V, 0.8V, and 1.0V supply voltages. Second, performing noise-aware training with the worst noise data at 1.0V supply acts as a generalization, and hence, across all noise profiles, overall more stable accuracy values were observed for the network trained on 1.0V supply voltage.

3. Noise from Different Chips

In this evaluation, the same noise-aware DNN training was performed for binary AlexNet and ResNet-18 by using five different noise probability tables, obtained from five different XNOR-SRAM chips at the same supply voltage of 0.6V. As shown in Table 1, Table 2, and Table 3, the noise-aware IMC inference accuracy is higher than the conventional IMC accuracy of the software baseline model across all five chips for different precisions of the ResNet-18 DNN trained on the CIFAR-10 dataset.

TABLE 1

IMC inference accuracies for binary ResNet-18 on CIFAR-10 dataset after different noise-aware training schemes.

Baseline Binary ResNet-18 CIFAR-10 Accuracy: 89.24 ± 1.05%

| Training<br>Inference | Conventional IMC<br>Baseline<br>Individual Chip | Noise-Aware IMC<br>Individual Chip<br>Individual Chip | Noise-Aware IMC<br>Ensemble (5 Chips)<br>Individual Chip | Noise-Aware IMC<br>Ensemble (5 Chips)<br>Ensemble (5 Chips) |
|---|---|---|---|---|
| Chip 1 | 85.24% ± 0.29% | 88.11% ± 0.61% | 87.26% ± 0.71% | |
| Chip 2 | 86.15% ± 0.32% | 87.63% ± 0.64% | 87.32% ± 0.65% | |
| Chip 3 | 86.3% ± 0.41% | 88.40% ± 0.56% | 87.36% ± 0.74% | 88.74% ± 0.42% |
| Chip 4 | 85.72% ± 0.31% | 88.32% ± 0.42% | 87.65% ± 0.38% | |

TABLE 1-continued

IMC inference accuracies for binary ResNet-18 on CIFAR-10 dataset after different noise-aware training schemes.

Baseline Binary ResNet-18 CIFAR-10 Accuracy: 89.24 ± 1.05%

| Training<br>Inference | Conventional IMC<br>Baseline<br>Individual Chip | Noise-Aware IMC<br>Individual Chip<br>Individual Chip | Noise-Aware IMC<br>Ensemble (5 Chips)<br>Individual Chip | Noise-Aware IMC<br>Ensemble (5 Chips)<br>Ensemble (5 Chips) |
|---|---|---|---|---|
| Chip 5 | 84.58% ± 0.52% | 88.36% ± 0.61% | 88.05% ± 0.62% | |
| Average | 85.60% ± 0.37% | 88.16% ± 0.57% | 87.53% ± 0.62% | 88.74% ± 0.42% |

TABLE 2

IMC inference accuracies for 2-bit ResNet-18 on CIFAR-10 dataset after different noise-aware training schemes.

Baseline 2-bit ResNet-18 CIFAR-10 Accuracy: 90.24 ± 0.53%

| Training<br>Inference | Conventional IMC<br>Baseline<br>Individual Chip | Noise-Aware IMC<br>Individual Chip<br>Individual Chip | Noise-Aware IMC<br>Ensemble (5 Chips)<br>Individual Chip | Noise-Aware IMC<br>Ensemble (5 Chips)<br>Ensemble (5 Chips) |
|---|---|---|---|---|
| Chip 1 | 84.13% ± 0.32% | 88.14% ± 0.72% | 88.54% ± 0.64% | |
| Chip 2 | 84.28% ± 0.28% | 88.34% ± 0.43% | 87.15% ± 0.73% | |
| Chip 3 | 84.45% ± 0.27% | 88.29% ± 0.58% | 88.26% ± 0.63% | 88.94% ± 0.39% |
| Chip 4 | 84.86% ± 0.35% | 88.62% ± 0.67% | 88.05% ± 0.82% | |
| Chip 5 | 84.22% ± 0.31% | 88.42% ± 0.48% | 87.19% ± 0.78% | |
| Average | 84.39% ± 0.30% | 88.362% ± 0.57% | 87.84% ± 0.72% | 88.94% ± 0.39% |

TABLE 3

IMC inference accuracies for 4-bit ResNet-18 on CIFAR-10 dataset after different noise-aware training schemes.

Baseline 4-bit ResNet-18 CIFAR-10 Accuracy: 92.81 ± 0.32%

| Training<br>Inference | Conventional IMC<br>Baseline<br>Individual Chip | Noise-Aware IMC<br>Individual Chip<br>Individual Chip | Noise-Aware IMC<br>Ensemble (5 Chips)<br>Individual Chip | Noise-Aware IMC<br>Ensemble (5 Chips)<br>Ensemble (5 Chips) |
|---|---|---|---|---|
| Chip 1 | 83.92% ± 0.26% | 90.32% ± 0.41% | 89.11% ± 0.53% | |
| Chip 2 | 83.84% ± 0.29% | 90.82% ± 0.36% | 88.63% ± 0.74% | |
| Chip 3 | 84.16% ± 0.33% | 91.11% ± 0.31% | 89.52% ± 0.58% | 88.96% ± 0.52% |
| Chip 4 | 84.08% ± 0.26% | 90.29% ± 0.53% | 88.93% ± 0.64% | |
| Chip 5 | 84.11% ± 0.37% | 90.13% ± 0.41% | 89.26% ± 0.42% | |
| Average | 84.02% ± 0.30% | 90.53% ± 0.40% | 87.84% ± 0.58% | 88.96% ± 0.52% |

4. Ensemble of Noise from Different Chips

An ensemble probability table was also obtained by combining the probability data from five different XNOR-SRAM chips. To achieve this, 100,000 random samplings of ADC quantization outputs were performed from each probability table for random inputs and the new ensemble probabilities from the pool of 500,000 quantization samplings were obtained. This noise probability table represents a more generalized version of the hardware noise and allows for testing the IMC hardware noise robustness of the DNNs when trained with a non-chip-specific noise. In Table 1, Table 2, and Table 3, five inference evaluations were performed for each evaluation, and the mean of the five inference accuracies and the average deviation from the mean are reported.

Table 1 shows the results obtained by performing ensemble noise-aware training on ResNet-18 DNN with different parameter precisions on the CIFAR-10 dataset. Besides showing the inference accuracy by using the ensemble probability table, the table also shows the inference accuracies obtained by using the individual chip probability tables during inference only. It can be noted that the same DNN with non-noise-aware training had an IMC inference accuracy of 86.54%. This was later improved to 88.75% on average by using the ensemble XNOR-SRAM noise data to perform noise-aware training.

Furthermore, similar results on 2-bit and 4-bit ResNet- 18 DNNs are shown in Table 2 and Table 3, respectively. It can be seen that although some accuracy is traded-off compared to the chip-specific noise-aware training, the generalized noise model still results in better performance than a non-noise-aware trained model. It is expected that such a generalized model will not be able to out-perform a highly chip-specific noise model in noise-aware training.

5. Accelerated Noise-Based Training

The noise-aware training demonstrates the capability of recovering the inference accuracy, however, it tends to require a long training time. This is because look-up operations need to be performed in order to implement the non-ideal noisy IMC quantization function. Training deeper and larger neural networks, and training with a larger dataset such as ImageNet can become a challenge when limited hardware resources are available. Therefore, to accelerate the training process, both ideal quantization noise-based training and single noise model-based training were evaluated. In the first evaluation, the bit-wise probability table-based noise injection was replaced with the ideal quantization function of the IMC hardware during DNN training. This noise model corresponds only to the ADC quantization under ideal circumstances and was expected to help improve the DNN accuracy compared to the non-noise-aware trained DNNs.

Another fast training model was also devised, where the bit-wise probability table-based noise injection was replaced with a single noise model obtained from the quantization error distribution shown in FIG. 4. The Gaussian curve that best fit the shown distribution was chosen as the single noise model, with a mean of 0.16 and a standard deviation of 5.99. This also accelerated the noise-aware training algorithm by up to 5× compared to the bit-wise probability table-based noise-aware training due to the closed-form nature of the continuous noise injection function.

Table 4 shows the results obtained when using ideal quantization-aware training and single noise model-based training on ResNet-18 binary DNN with the CIFAR-10 dataset. The ResNet-18 DNN trained without any noise injection is used as the baseline for this comparison. It can be observed that there is about 3.96% degradation in accuracy when this model is deployed on the IMC hardware. The reported results correspond to the mean of the accuracy and its 3-variation across 10 evaluations. The results show that the IMC inference accuracy after quantization-aware training is improved by 1.05% when compared to the IMC inference accuracy on the software baseline model. On the other hand, the single noise model-based training also improves the IMC inference accuracy by 1.08% compared to that of the baseline model.

TABLE 4

IMC inference accuracies for binary ResNet-18 on CIFAR-10 dataset are improved after training with the ideal quantization noise injection (quant.) and with the single noise model (SNM).

Baseline Acc.—No Noise Injection = 89.24% ± 1.05%

| Model | IMC Inference Accuracy (%) |
|---|---|
| Baseline | 86.54 ± 0.43 |
| Quant. Aware | 87.59 ± 0.38 |
| SNM | 87.62 ± 0.41% |

B. C3SRAM Noise-Aware Training With CIFAR-10 Dataset

Noise-aware training was also performed using the noise data obtained from another IMC hardware, the C3SRAM chip. The noise data measured from the C3SRAM chip at 1.0V and 0.6V supply voltages was used. Three different binary DNNs were trained in software without noise injection first and then the baseline and C3SRAM IMC hardware inference accuracies were obtained for each of them. After that, noise-aware training was performed by substituting the XNOR-SRAM noise data with C3SRAM noise data during training and the C3SRAM IMC hardware inference accuracy was evaluated.

Figure 9A:
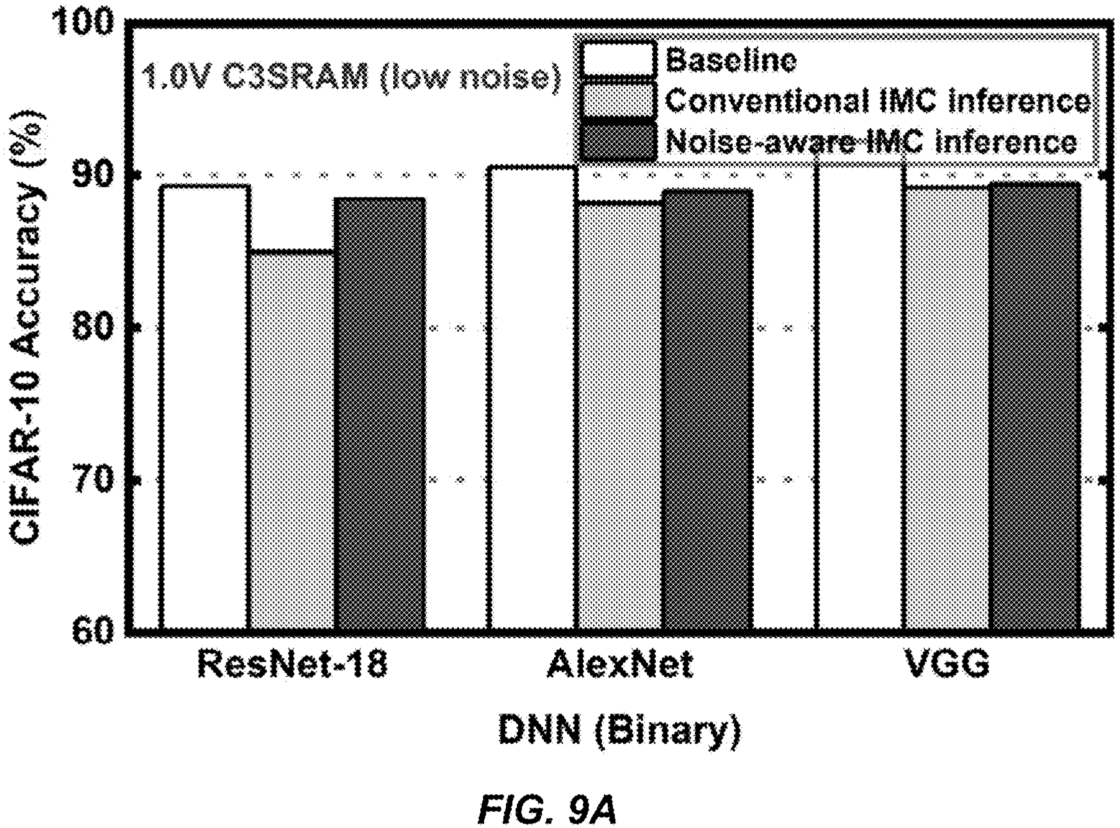
FIG. 9A is a graphical representation of IMC inference accuracy after hardware noise-aware training using 1.0V C3SRAM noise data.

FIG. 9A is a graphical representation of IMC inference accuracy after hardware noise-aware training using 1.0V C3SRAM noise data. FIG. 9A shows the IMC hardware inference accuracy improvements obtained in three different binary DNNs after performing noise-aware training using the 1.0V C3SRAM chip noise data. In particular, the accuracies of ResNet-18, the IMC hardware accuracy was improved by 3.8% from 84.94% before noise-aware training to 88.74% after noise-aware training.

Figure 9B:
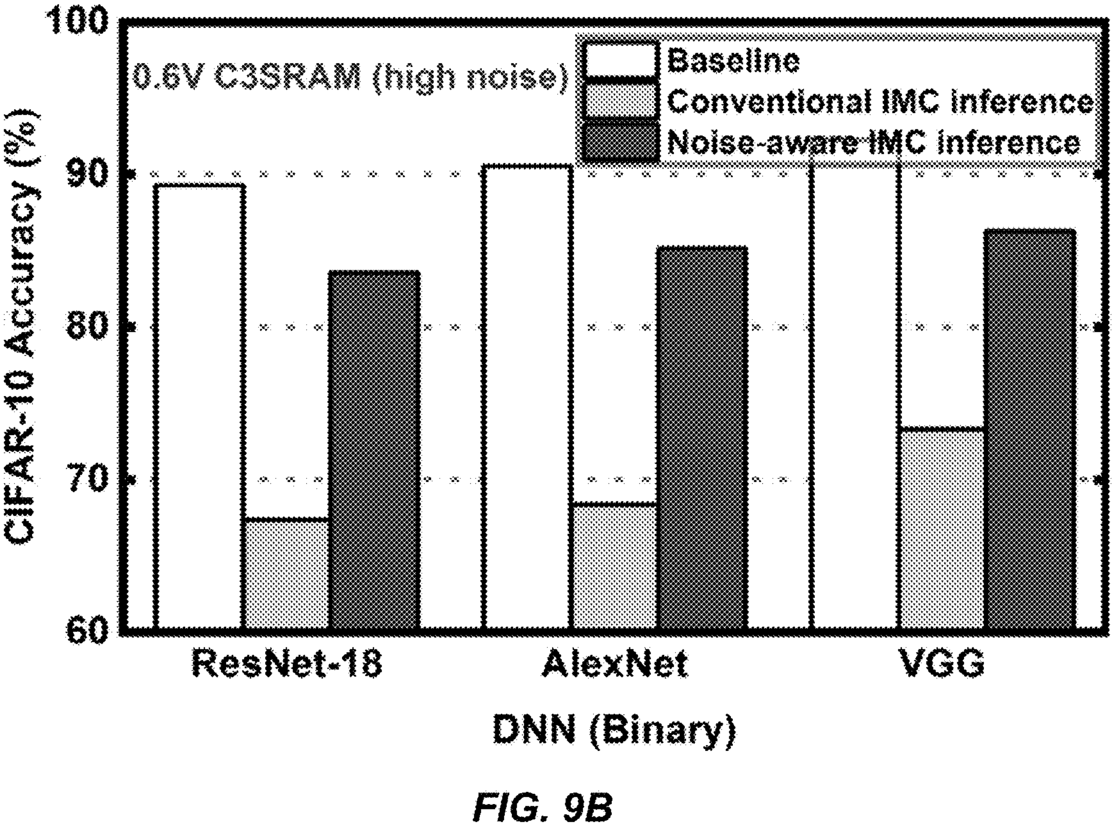
FIG. 9B is a graphical representation of IMC inference accuracy after hardware noise-aware training using 0.6V C3SRAM noise data for binary DNNs on CIFAR-10 dataset.

FIG. 9B is a graphical representation of IMC inference accuracy after hardware noise-aware training using 0.6V C3SRAM noise data for binary DNNs on CIFAR-10 dataset. Unlike the XNOR-SRAM IMC hardware where the noise decreases as the supply voltage is decreased from 1.0V to 0.6V, the noise in C3SRAM IMC hardware increases as the supply voltage is lowered. This is because the XNOR-SRAM devices' IR-drop increases due to an increase in current at higher supply voltages, whereas the C3SRAM's bitline voltage range decreases due to capacitive-coupling when the supply voltage is decreased. Thus, the analog voltage cannot be efficiently digitized due to the limited ADC precision. Hence, the IMC inference on the software-trained baseline models using the 0.6V C3SRAM data exhibits significant accuracy degradation compared to the baseline, as shown in FIG. 9B. On the other hand, performing noise-aware training with this IMC noise, the noise-aware IMC accuracy was significantly improved. For example, in the case of binary ResNet-18, the CIFAR-10 IMC inference was improved from 67.35% to 83.55%.

C. Comparison to Similar Works

The performance of the proposed noise-aware training algorithm was also compared with two other similar works (Joshi, V. et al, "Accurate Deep Neural Network Inference Using Computational Phase-Change Memory," in *Nature Communications,* 11(1): 1-13, 2020) and (Zhou, C., Kadambi, P., Mattina, M., and Whatmough, P. N., "Noisy Machines: Understanding Noisy Neural Networks and Enhancing Robustness to Analog Hardware Errors Using Distillation," arXiv preprint,arXiv: 2001.04974, 2020), both articles of which are incorporated herein by reference in their entirety. In both of these works, noise-aware training was performed by injecting noise at the weight-level drawn from Gaussian distributions, in addition to knowledge distillation in Zhou et al. Moreover, the parameters of the Gaussian distribution used by Joshi et al. to inject noise into weights were determined based on their 11-level PCM hardware, which supported 3.5 bits of precision for weights. Both these works injected noise at a much lower granularity of individual weights.

However, this is not a highly accurate emulation of IMC hardware noise which contains both quantization noise and device noise lumped at the partial sum level of the IMC crossbar. Furthermore, the variations of transistors/wires/capacitors are not accounted for when using standard Gaussian distributions. In comparison, noise injection was performed at the partial sum level, which is more specific to IMC computations, therefore making it more relevant. In an attempt to make an apple-to-apple comparison of the proposed scheme and prior works, noise-aware training was performed using the approaches proposed by prior works and evaluated with the same XNOR-SRAM IMC chip hardware measurement results.

Noise-aware training was performed using the $\eta_{tr}=\eta_{inf}$ combination with a value of 0.11 for the work of Joshi et al. and a value of 0.058 for the work of Zhou et al. These values were chosen so that the noise remains the same during training and inference, and also the noise remains quantitatively similar to the single noise model obtained from the best Gaussian fit for the quantization error distribution shown in FIG. 4. The standard deviation of the Gaussian curve corresponding to the single noise model is 5.99, and the maximum and minimum values on which noise is applied are +60 and −60 respectively (quantized partial sum in this case, whereas it is weights in the above-referenced cases). If these values are substituted into the noise formula of $$\frac{\sigma_{noise}}{W_{max}} = \eta$$

provided by Joshi et al. and the noise formula of $$\sigma^{l}_{noise} = \eta \times (W^{l}_{max} - W^{l}_{min})$$

provided by Zhou et al., the aforementioned values of η are obtained.

Table 5 shows the IMC inference accuracies on ResNet-18 with different activation/weight precisions and trained using the CIFAR-10 dataset. The IMC-Joshi and IMC-Zhou columns show the XNOR-SRAM IMC inference accuracies on the DNN models trained using the noise-aware training method proposed by Joshi et al. and by Zhou et al., respectively. The IMC-Proposed column shows the XNOR-SRAM IMC inference accuracies on the DNN models trained using the proposed chip-specific noise-aware training. It can be seen that the proposed chip-specific IMC hardware noise-aware training achieves better DNN inference accuracy across different parameter precisions of the ResNet-18 DNN, compared to the results achieved by Joshi et al. and Zhou et al.

TABLE 5

Noise-aware training comparison to Joshi et al. and Zhou et al.
CIFAR-10 IMC Inference Accuracy (%)

| DNN | IMC-Joshi | IMC-Zhou | IMC-Proposed |
|---|---|---|---|
| ResNet-18 (1-bit) | 87.82 | 87.32 | 88.4 |
| ResNet-18 (2-bit) | 87.95 | 87.48 | 88.6 |
| ResNet-18 (4-bit) | 89.14 | 88.26 | 91.11 |

Figure 10:
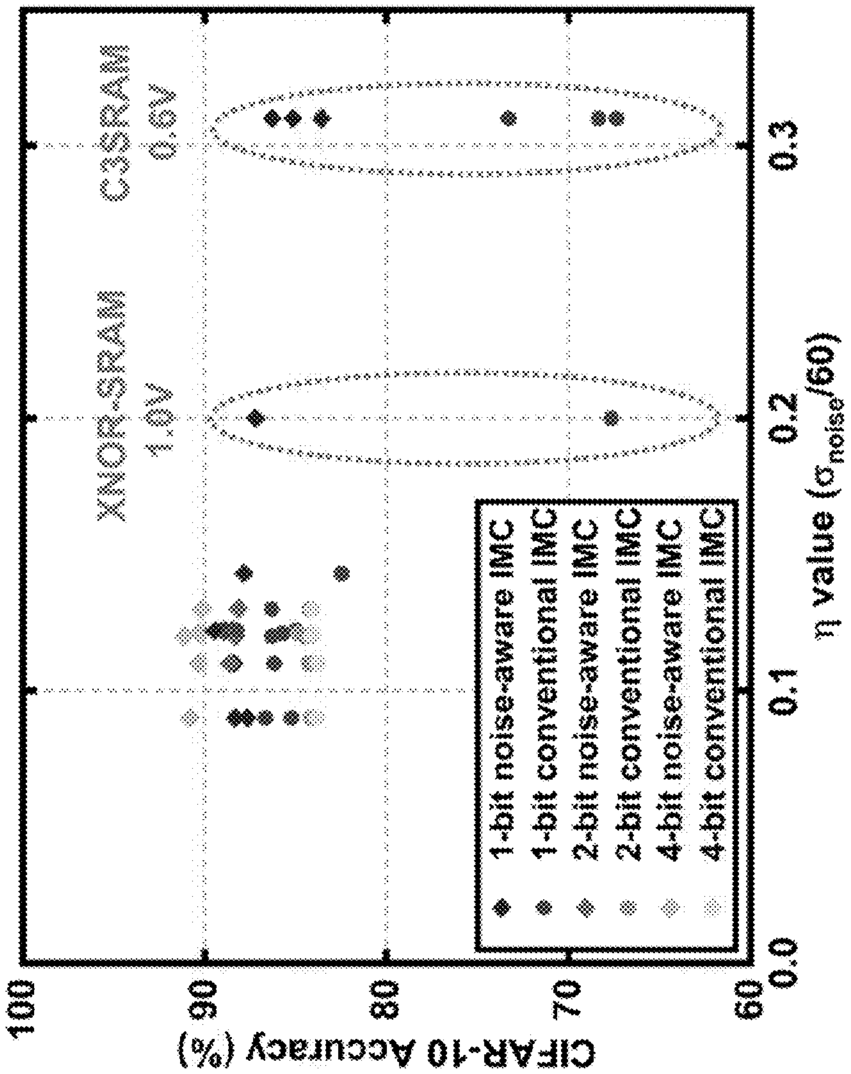
FIG. 10 is a graphical representation providing an overall summary of the evaluations performed herein.

FIG. 10 is a graphical representation providing an overall summary of the evaluations performed herein. The x-axis values are calculated using the standard deviation of the noise and quantization boundary according to the formula reported by Joshi et al., where the $w_{max}$ is set as +60.

V. Flow Diagram

Figure 11:
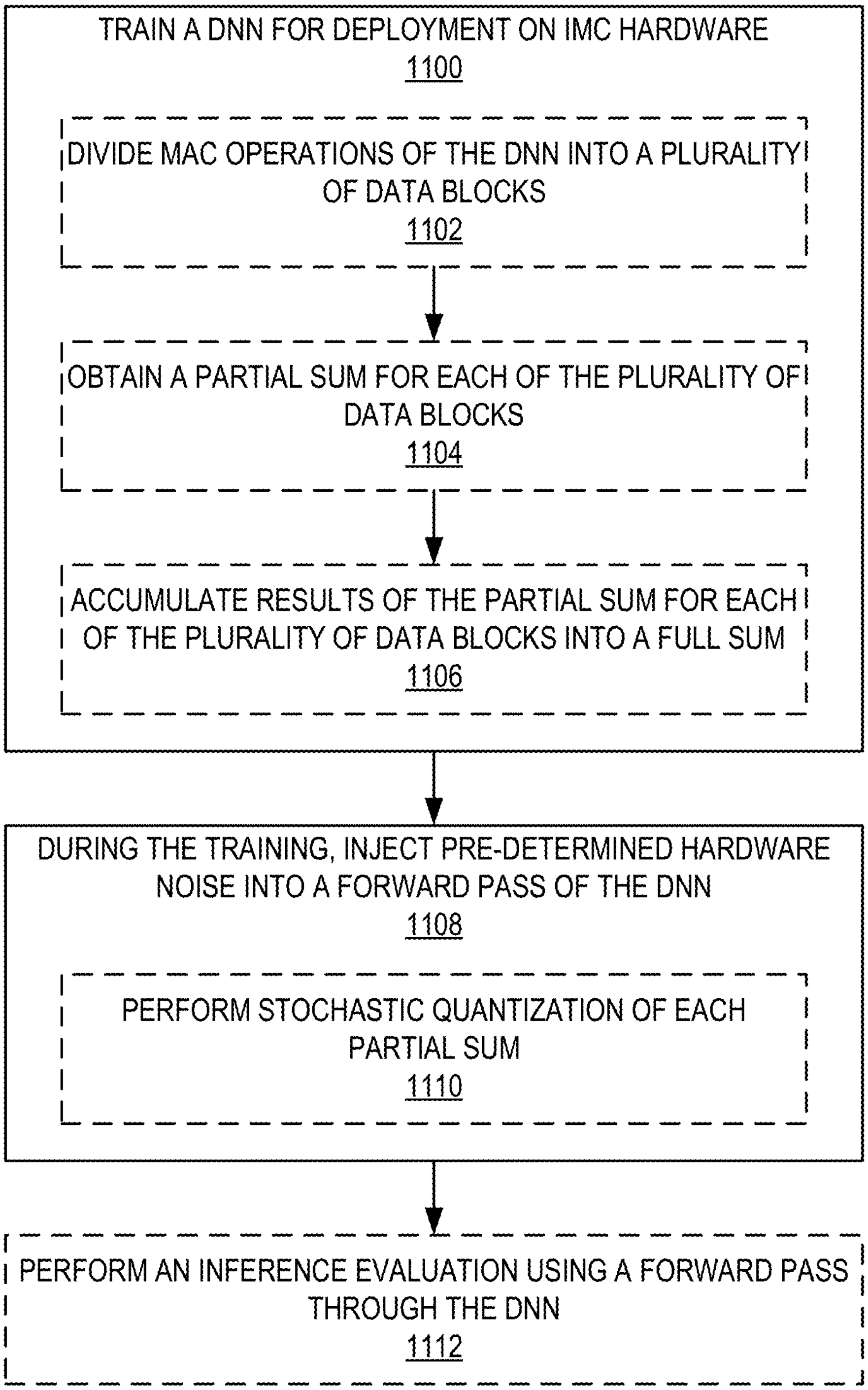
FIG. 11 is a flow diagram illustrating a process for performing hardware noise-aware training for a DNN.

FIG. 11 is a flow diagram illustrating a process for performing hardware noise-aware training for a DNN. The process begins at operation 1100, with training the DNN for deployment on IMC hardware. Operation 1100 may include operation 1102, with dividing MAC operations of the DNN into a plurality of data blocks. In an exemplary aspect, the size of each data block is equal to the number of rows of an IMC memory array of the IMC hardware. Operation 1100 may further include operation 1104, with obtaining a partial sum for each of the plurality of data blocks. Operation 1100 may further include operation 1106, with accumulating results of the partial sum for each of the plurality of data blocks into a full sum.

The process continues at operation 1108, with, during the training, injecting pre-determined hardware noise into a forward pass of the DNN. Operation 1108 may optionally include operation 1110, with performing stochastic quantization of each partial sum. The process optionally continues at operation 1112, with performing an inference evaluation using a forward pass through the DNN.

Although the operations of FIG. 11 are illustrated in a series, this is for illustrative purposes and the operations are not necessarily order dependent. Some operations may be performed in a different order than that presented. For example, operations 1100 and 1102 are generally performed concurrently. Further, processes within the scope of this disclosure may include fewer or more steps than those illustrated in FIG. 11.

VI. Computer System

Figure 12:
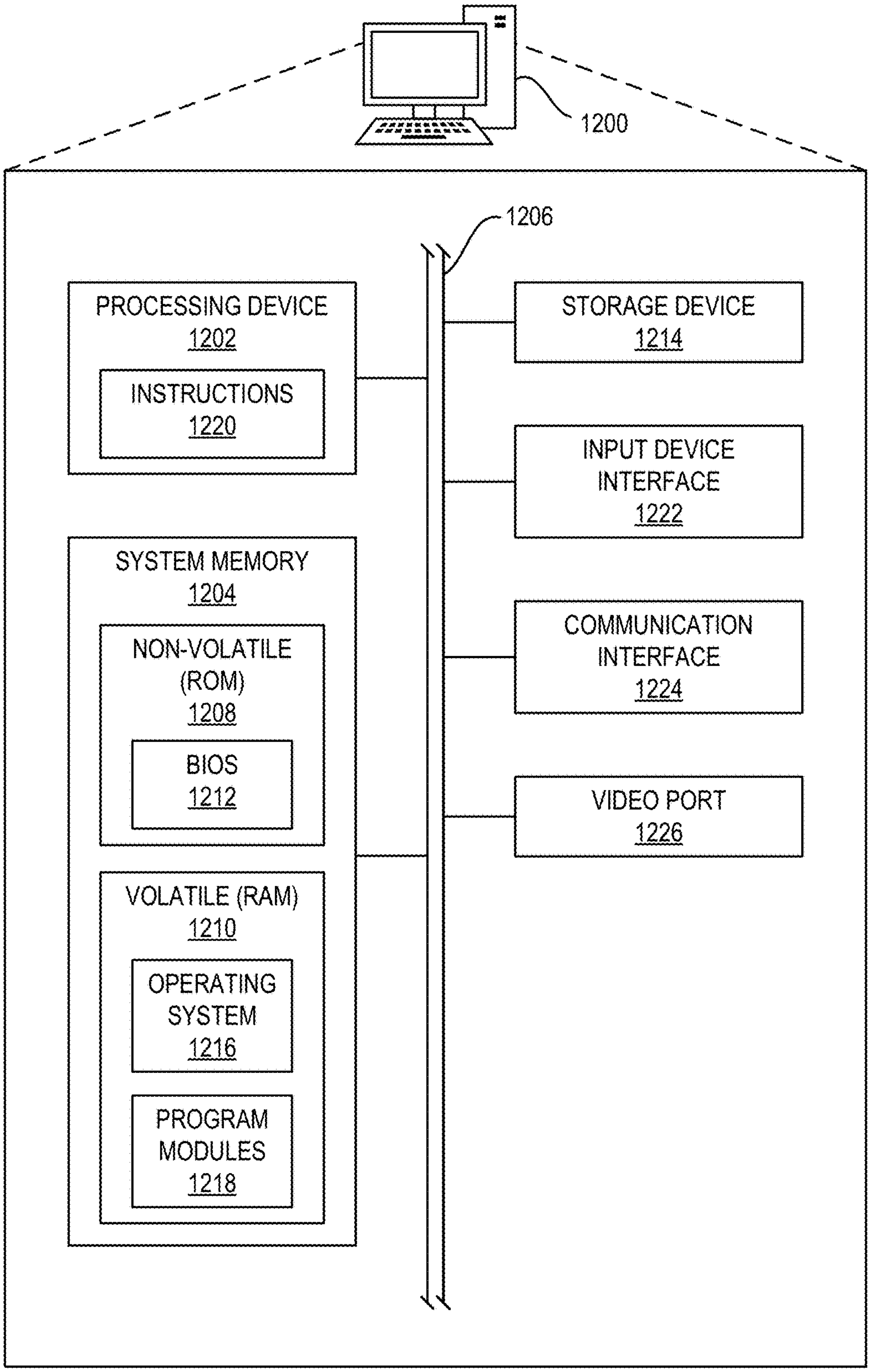
FIG. 12 is a block diagram of a computer system suitable for implementing hardware noise-aware training according to embodiments disclosed herein.

FIG. 12 is a block diagram of a computer system 1200 suitable for implementing hardware noise-aware training according to embodiments disclosed herein. The computer system 1200 includes or is implemented as an IMC engine, and comprises any computing or electronic device capable of including firmware, hardware, and/or executing software instructions that could be used to perform any of the methods or functions described above. In this regard, the computer system 1200 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1200 in this embodiment includes a processing device 1202 or processor, a system memory 1204, and a system bus 1206. The system memory 1204 may include non-volatile memory 1208 and volatile memory 1210. The non-volatile memory 1208 may include read-only memory (ROM), erasable programmable read-only memory (EPROM), electrically erasable programmable read-only memory (EEPROM), and the like. The volatile memory 1210 generally includes random-access memory (RAM) (e.g., dynamic random-access memory (DRAM), such as synchronous DRAM (SDRAM)). A basic input/output system (BIOS) 1212 may be stored in the non-volatile memory 1208 and can include the basic routines that help to transfer information between elements within the computer system 1200.

The system bus 1206 provides an interface for system components including, but not limited to, the system memory 1204 and the processing device 1202. The system bus 1206 may be any of several types of bus structures that may further interconnect to a memory bus (with or without a memory controller), a peripheral bus, and/or a local bus using any of a variety of commercially available bus architectures.

The processing device 1202 represents one or more commercially available or proprietary general-purpose processing devices, such as a microprocessor, central processing unit (CPU), or the like. More particularly, the processing device 1202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1202 is configured to execute processing logic instructions for performing the operations and steps discussed herein.

In this regard, the various illustrative logical blocks, modules, and circuits described in connection with the embodiments disclosed herein may be implemented or performed with the processing device 1202, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1202 may be a microprocessor, or may be any conventional processor, controller, microcontroller, or state machine. The processing device 1202 may also be implemented as a combination of computing devices (e.g., a combination of a DSP and a microprocessor, a plurality of microprocessors, one or more microprocessors in conjunction with a DSP core, or any other such configuration).

The computer system 1200 may further include or be coupled to a non-transitory computer-readable storage medium, such as a storage device 1214, which may represent an internal or external hard disk drive (HDD), flash memory, or the like. The storage device 1214 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1216 and any number of program modules 1218 or other applications can be stored in the volatile memory 1210, wherein the program modules 1218 represent a wide array of computer-executable instructions corresponding to programs, applications, functions, and the like that may implement the functionality described herein in whole or in part, such as through instructions 1220 on the processing device 1202. The program modules 1218 may also reside on the storage mechanism provided by the storage device 1214. As such, all or a portion of the functionality described herein may be implemented as a computer program product stored on a transitory or non-transitory computer-usable or computer-readable storage medium, such as the storage device 1214, volatile memory 1210, non-volatile memory 1208, instructions 1220, and the like. The computer program product includes complex programming instructions, such as complex computer-readable program code, to cause the processing device 1202 to carry out the steps necessary to implement the functions described herein.

An operator, such as the user, may also be able to enter one or more configuration commands to the computer system 1200 through a keyboard, a pointing device such as a mouse, or a touch-sensitive surface, such as the display device, via an input device interface 1222 or remotely through a web interface, terminal program, or the like via a communication interface 1224. The communication interface 1224 may be wired or wireless and facilitate communications with any number of devices via a communications network in a direct or indirect fashion. An output device, such as a display device, can be coupled to the system bus 1206 and driven by a video port 1226. Additional inputs and outputs to the computer system 1200 may be provided through the system bus 1206 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for performing hardware noise-aware training for a deep neural network (DNN), the method comprising:

performing software training of the DNN for deployment on in-memory computing (IMC) hardware, wherein the software training comprises injecting, into a forward pass of the DNN, emulated hardware noise including analog computation noise, the emulated hardware noise corresponding to noise in the IMC hardware.

2. The method of claim 1, wherein injecting the emulated hardware noise comprises emulating a dot-product computation of the IMC hardware.

3. The method of claim 2, wherein injecting the emulated hardware noise further comprises using conditional probability tables to transform partial sums.

4. The method of claim 1, wherein the performing of the software training of the DNN for deployment on the IMC hardware comprises dividing multiply-and-accumulate (MAC) operations of the DNN into a plurality of data blocks based on a parameter of the IMC hardware.

5. The method of claim 4, wherein a size of each data block is equal to a number of rows of an IMC memory array of the IMC hardware.

6. The method of claim 4, wherein the performing of the software training of the DNN for deployment on the IMC hardware further comprises:

obtaining a partial sum for each of the plurality of data blocks; and accumulating results of the partial sum for each of the plurality of data blocks into a full sum.

7. The method of claim 6, wherein injecting emulated hardware noise into the forward pass of the DNN comprises performing stochastic quantization of each partial sum.

8. The method of claim 1, wherein the performing of the software training of the DNN for deployment on IMC hardware comprises using a forward pass through a plurality of convolution layers and at least one fully-connected layer of the DNN and a backward pass through the plurality of convolution layers and the at least one fully-connected layer.

9. The method of claim 8, further comprising using a straight-through estimator on the backward pass to correct the software training.

10. The method of claim 8, further comprising performing an inference evaluation using a forward pass through the plurality of convolution layers and the at least one fully-connected layer of the DNN.

11. The method of claim 1, comprising performing noise-aware training using a single noise model approximation of the IMC hardware.

12. A computing system, comprising an in-memory computing (IMC) engine configured to perform software training of a deep neural network (DNN) for deployment on in-memory computing (IMC) hardware, wherein the software training comprises injecting, into a forward pass of the DNN, emulated hardware noise including analog computation noise, the emulated hardware noise corresponding to noise in the IMC hardware.

13. The computing system of claim 12, wherein the IMC hardware comprises resistive IMC hardware.

14. The computing system of claim 12, wherein the IMC hardware comprises capacitive IMC hardware.

15. The computing system of claim 12, wherein the IMC engine comprises a plurality of convolution layers and at least one fully-connected layer of the DNN.

16. The computing system of claim 15, wherein the IMC engine is configured to train the DNN using a forward pass through the plurality of convolution layers and the at least one fully-connected layer and a backward pass through the plurality of convolution layers and the at least one fully-connected layer.

17. The computing system of claim 16, wherein the IMC engine is further configured to perform inferences using the forward pass through the plurality of convolution layers and the at least one fully-connected layer.

18. The computing system of claim 16, wherein during training weights of the plurality of convolution layers and the at least one fully-connected layer are trained to minimize a loss function.

19. The computing system of claim 18, wherein the weights are updated during the backward pass through the plurality of convolution layers and the at least one fully-connected layer.

20. The computing system of claim 12, wherein the IMC engine is configured to perform noise-aware training using a single noise model approximation of the IMC hardware.

* * * * *